United States Patent [19]

Nishikawa et al.

[11] Patent Number: 4,860,272

[45] Date of Patent: Aug. 22, 1989

[54] ERRONEOUS TRACK JUMP RESTORATION APPARATUS FOR OPTICAL RECORD DISC PLAYER

[75] Inventors: Meisei Nishikawa, Musashino; Jun Inagawa, Yokohama; Takeshi Inagaki, Yokohama; Toshihiko Kaneshige, Yokohama; Yasuhiro Hayashi, Yokohama; Tadashi Kojima, Yokohama, all of Japan

[73] Assignee: Kabushiki Kaisha Toshiba, Kanagawa, Japan

[21] Appl. No.: 99,384

[22] Filed: Sep. 21, 1987

[30] Foreign Application Priority Data

Sep. 19, 1986 [JP] Japan .................................. 61-221427
Sep. 19, 1986 [JP] Japan .................................. 61-221428
Sep. 19, 1986 [JP] Japan .................................. 61-221430
Sep. 19, 1986 [JP] Japan .................................. 61-221431

[51] Int. Cl.$^4$ ........................ G11B 5/09; G11B 21/08; G01D 15/10

[52] U.S. Cl. ........................ 369/48; 369/44; 369/100; 369/111; 369/120; 369/128; 360/78; 346/76 L

[58] Field of Search ........................ 369/43, 44, 48, 83, 369/100, 111, 120, 128, 131; 360/78, 77, 29, 48, 49; 346/76 L

[56] References Cited

U.S. PATENT DOCUMENTS

| | | | |
|---|---|---|---|
| 4,611,314 | 9/1986 | Ogata et al. | 369/48 X |
| 4,648,085 | 3/1987 | Shimonou | 369/54 |
| 4,675,857 | 6/1987 | Schylander | 369/48 X |
| 4,677,606 | 6/1987 | Ogata et al. | 369/48 X |
| 4,759,006 | 7/1988 | Koishi et al. | 369/44 |
| 4,763,205 | 8/1988 | Okano | 369/44 X |
| 4,796,247 | 1/1989 | Vogelsang | 369/44 |
| 4,807,206 | 2/1989 | Moriya et al. | 369/44 X |

Primary Examiner—William L. Sikes
Assistant Examiner—Brian M. Healy
Attorney, Agent, or Firm—Finnegan, Henderson, Farabow, Garrett, & Dunner

[57] ABSTRACT

An apparatus for reproducing data stored on a disc in a plurality of tracks connected in a continuous spiral or separated in concentric tracks. The apparatus includes a device for rotating the disc, an optical pickup device aligned with one of the tracks for reading the data from the track, the pickup being subject to jump movement of alignment with the track into alignment with another track in response to movement of the device, a buffer memory device temporarily storing successive portions of the data read from the track for delaying reproduction of the data for a predetermined time after the reading of the data, a track jump detection device for detecting movement of the pickup device into alignment with another track and interrupting temporary storage of the data read from the other track by the buffer memory device, a drive device for moving the pickup device with respect to the disc for reading data, and for changing the alignment of the pickup device from the other track to the one track in response to the track jump detection device, and an output device for substantially uninterrupted reproduction of the temporarily stored data.

5 Claims, 36 Drawing Sheets

|  | $W_r$ | $C_1$ | $C_2$ | $R_e$ |
|---|---|---|---|---|
| $U_0$ | A | B | B−6 | B−7 |
| $U_1$ | A | B | B−5 | B−6 |
| $U_2$ | A | B | B−4 | B−5 |
| $U_3$ | A | B | B−3 | B−4 |
| $U_4$ | A | B | B−2 | B−3 |
| $U_5$ | A | B | B−1 | B−2 |

*FIG.4.*
(PRIOR ART)

|  |  | FRAME ADDRESS ($A_0 \sim A_3$) | | | | | | | | | | | | | | | |
|---|---|---|---|---|---|---|---|---|---|---|---|---|---|---|---|---|---|
|  | $A_4 \sim A_6$ | 0 | 1 | 2 | 3 | 4 | 5 | 6 | 7 | 8 | 9 | 10 | 11 | 12 | 13 | 14 | 15 |
| $U_0$ | 0 | $R_e$ | $C_2$ |  |  |  |  |  | $C_1$ |  |  |  | $W_r$ |  |  |  |  |
| $U_1$ | 1 |  | $R_e$ | $C_2$ |  |  |  |  | $C_1$ |  |  |  | $W_r$ |  |  |  |  |
| $U_2$ | 2 |  |  | $R_e$ | $C_2$ |  |  |  | $C_1$ |  |  |  | $W_r$ |  |  |  |  |
| $U_3$ | 3 |  |  |  | $R_e$ | $C_2$ |  |  | $C_1$ |  |  |  | $W_r$ |  |  |  |  |
| $U_4$ | 4 |  |  |  |  | $R_e$ | $C_2$ |  | $C_1$ |  |  |  | $W_r$ |  |  |  |  |
| $U_5$ | 5 |  |  |  |  |  | $R_e$ | $C_2$ | $C_1$ |  |  |  | $W_r$ |  |  |  |  |

*FIG.5.*
(PRIOR ART)

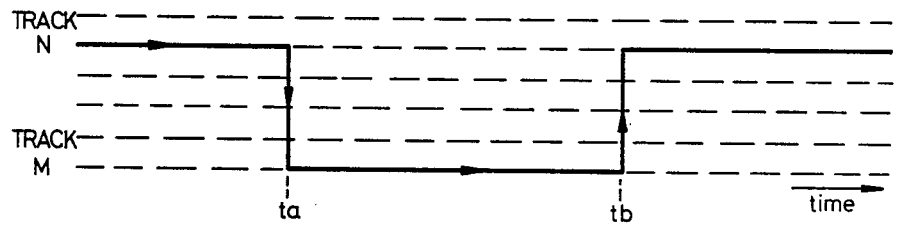
(a)
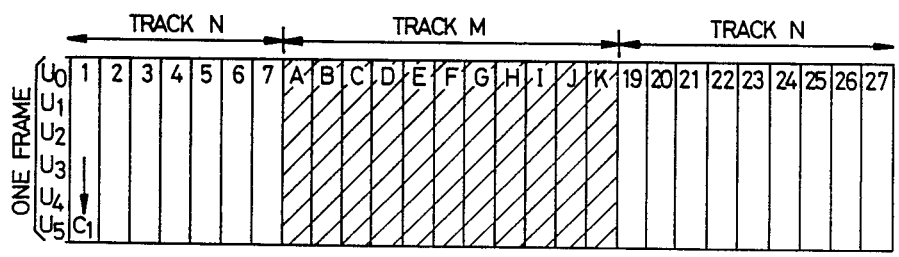
(b)
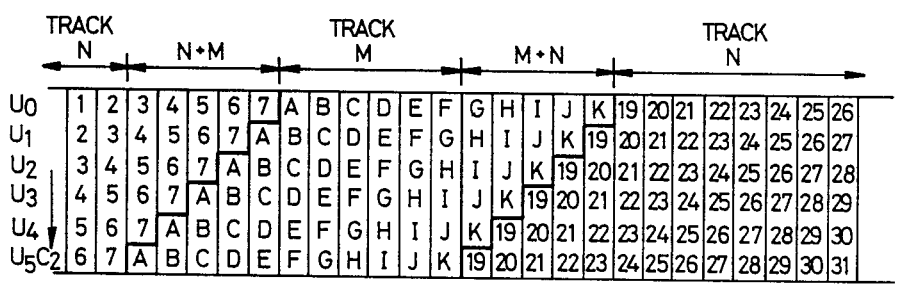
(c)
FIG.6.
(PRIOR ART)

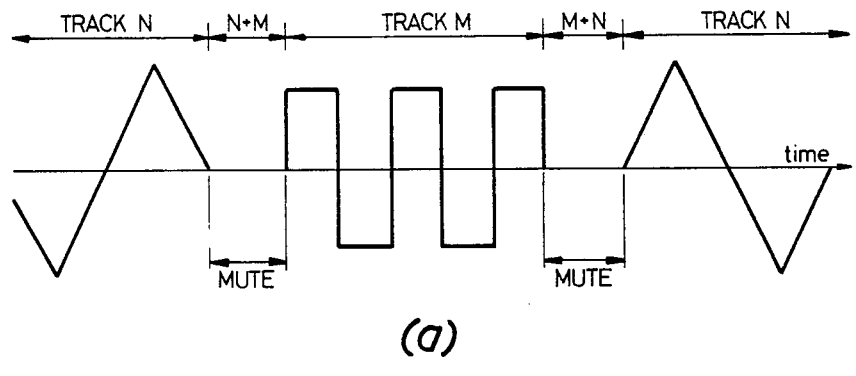
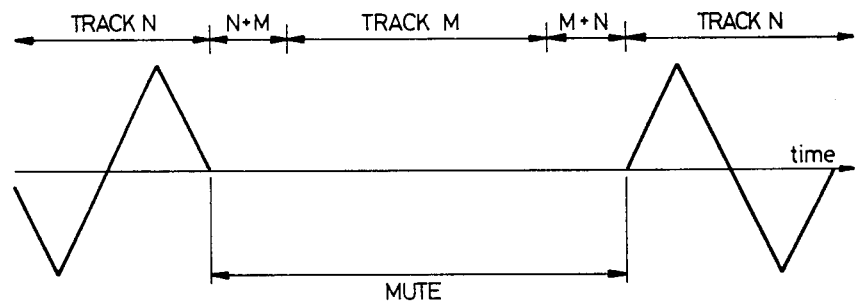
FIG. 7.
(PRIOR ART)

FIG.24.

| | Wr | C₁ | C₂ | Re |
|---|---|---|---|---|
| U₀ | A-X | B | B-6 | B-7 |
| U₁ | A-X | B | B-5 | B-6 |
| U₂ | A-X | B | B-4 | B-5 |
| U₃ | A-X | B | B-3 | B-4 |
| U₄ | A-X | B | B-2 | B-3 |
| U₅ | A-X | B | B-1 | B-2 |

FIG.25.

| A5~A7 | ADDRESS (A0~A4) | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| U₀ 0 | | Re | C₂ | | | | | C₁ | | | | | | | | | | | | | | | | | | | | Wr | | | | |
| U₁ 1 | | | Re | C₂ | | | | C₁ | | | | | | | | | | | | | | | | | | | | Wr | | | | |
| U₂ 2 | | | | Re | C₂ | | | C₁ | | | | | | | | | | | | | | | | | | | | Wr | | | | |
| U₃ 3 | | | | | Re | C₂ | | C₁ | | | | | | | | | | | | | | | | | | | | Wr | | | | |
| U₄ 4 | | | | | | Re | C₂ | C₁ | | | | | | | | | | | | | | | | | | | | Wr | | | | |
| U₅ 5 | | | | | | | Re | C₂ | | | | | | | | | | | | | | | | | | | | Wr | | | | |

| | ADDRESS $A_0 \sim A_4$ | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| $A_5 \sim A_7$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| $U_0$ 0 | 0 | 1 | 2 | 3 | 4 | 5 | 6 | 7 | 8 | 9 | 10 | 11 | 12 | F | G | H | I | J | K | L | M | N | | | | | | | | | | |
| $U_1$ 1 | 0 | 1 | 2 | 3 | 4 | 5 | 6 | 7 | 8 | 9 | 10 | 11 | 12 | F | G | H | I | J | K | L | M | N | | | | | | | | | | |
| $U_2$ 2 | 0 | 1 | 2 | 3 | 4 | 5 | 6 | 7 | 8 | 9 | 10 | 11 | 12 | F | G | H | I | J | K | L | M | N | | | | | | | | | | |
| $U_3$ 3 | 0 | 1 | 2 | 3 | 4 | 5 | 6 | 7 | 8 | 9 | 10 | 11 | 12 | F | G | H | I | J | K | L | M | N | | | | | | | | | | |
| $U_4$ 4 | 0 | 1 | 2 | 3 | 4 | 5 | 6 | 7 | 8 | 9 | 10 | 11 | 12 | F | G | H | I | J | K | L | M | N | | | | | | | | | | |
| $U_5$ 5 | 0 | 1 | 2 | 3 | 4 | 5 | 6 | 7 | 8 | 9 | 10 | 11 | 12 | F | G | H | I | J | K | L | M | N | | | | | | | | | | |

|  | Wr | C1 | C2 | Re |
|---|---|---|---|---|
| U0 | A | B | B-6 | C-6 |
| U1 | A | B | B-5 | C-5 |
| U2 | A | B | B-4 | C-4 |
| U3 | A | B | B-3 | C-3 |
| U4 | A | B | B-2 | C-2 |
| U5 | A | B | B-1 | C-1 |

FIG. 30.

| A5~A7 | ADDRESS A0~A4 | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 U0 | Re |  |  |  |  |  |  |  |  |  |  |  |  |  |  |  |  |  |  |  |  |  | C2 |  |  |  |  |  | C1 |  | Wr |  |
| 1 U1 |  | Re |  |  |  |  |  |  |  |  |  |  |  |  |  |  |  |  |  |  |  |  |  | C2 |  |  |  |  | C1 |  | Wr |  |
| 2 U2 |  |  | Re |  |  |  |  |  |  |  |  |  |  |  |  |  |  |  |  |  |  |  |  |  | C2 |  |  |  | C1 |  | Wr |  |
| 3 U3 |  |  |  | Re |  |  |  |  |  |  |  |  |  |  |  |  |  |  |  |  |  |  |  |  |  | C2 |  |  | C1 |  | Wr |  |
| 4 U4 |  |  |  |  | Re |  |  |  |  |  |  |  |  |  |  |  |  |  |  |  |  |  |  |  |  |  | C2 |  | C1 |  | Wr |  |
| 5 U5 |  |  |  |  |  | Re |  |  |  |  |  |  |  |  |  |  |  |  |  |  |  |  |  |  |  |  |  | C2 | C1 |  | Wr |  |

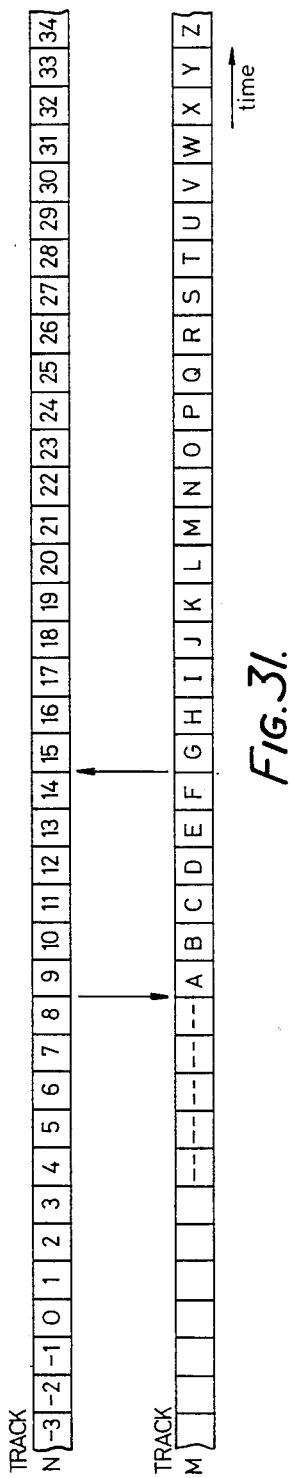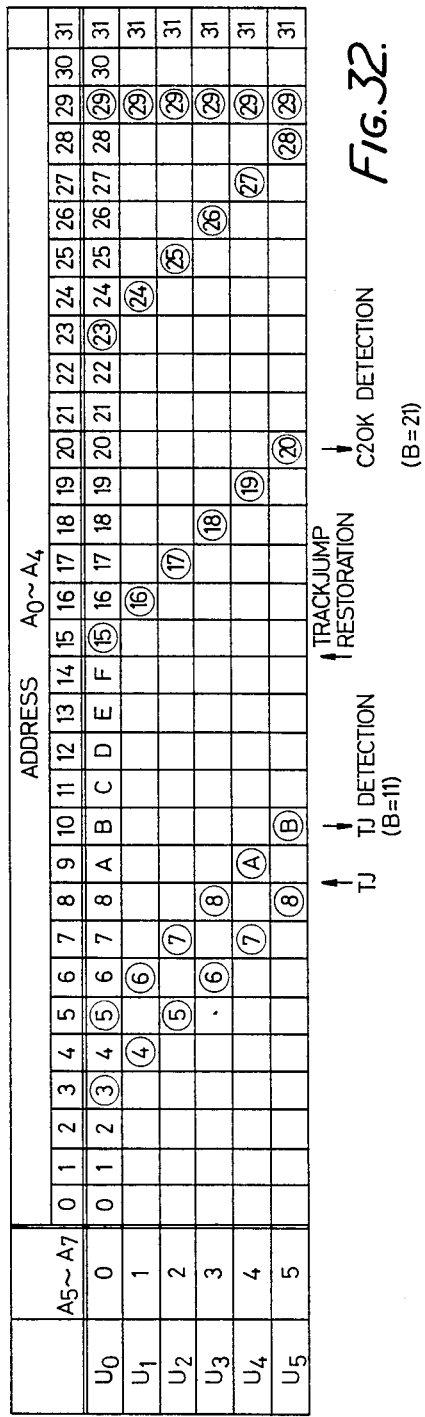
Fig. 31.
Fig. 32.

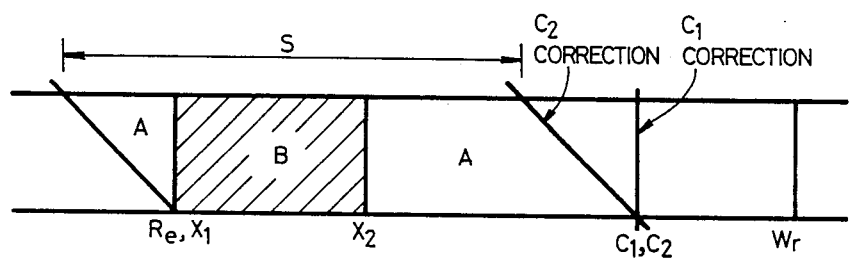
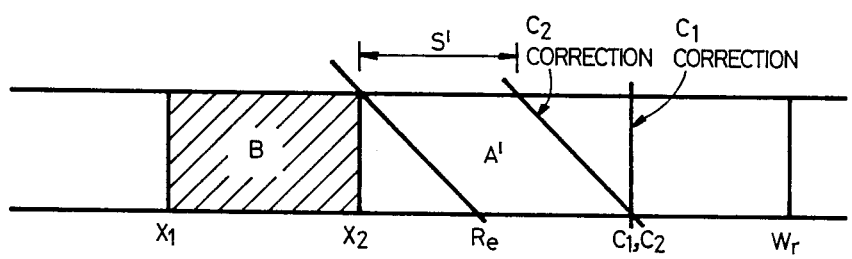
FIG. 35.

ERRONEOUS TRACK JUMP RESTORATION APPARATUS FOR OPTICAL RECORD DISC PLAYER

FIELD OF THE INVENTION

The present invention relates generally to an optical record disc player, and more particularly, to a erroneous track jump restoration apparatus for an optical record disc player.

BACKGROUND OF THE INVENTION

The present invention relates to, for example, a disc reproducing device of an optical CD (compact disc) system, and particularly, to a disc reproducing device so designed that the reproducing signal is not interrupted even if an erroneous track jump occurs during reproduction.

As is well known in the field of audio apparatus, digital record reproducing systems have been generally adopted for the purpose of reproducing recorded data of high density and high fidelity. In these systems, audio signals are converted into digitized data by a PCM (Pulse Code Modulation) technique and this data is recorded on a recording medium, such as a disc or a magnetic tape, to be reproduced. Among these systems, the compact disc is mainly used at present. In this case, a binary digit (bit) string corresponding to digitized data is formed on a disc of about 12 cm in diameter, and is optically read.

A disc reproducing device for reproducing the compact disc as described above, moves an optical pickup provided with a semiconductor laser and a photoelectric conversion device in a constant linear velocity tracking system (CLV) from the inner periphery side to the outer periphery side of the disc, and by rotating the compact disc the data recorded on the compact disc may be read.

On the compact disc, digital audio data (main information data) in the form of analog audio signals which have been PCM modulated in 8 bits is recorded. In this case, the digital audio data is recorded in the form of units of 24 symbols, each symbol constituting 8 bits. Each unit is called a frame or word and this frame is repeated.

In particular, as shown in FIG. 1, digital audio data (hereinafter called a word) Wm is supplied to a C2 system parity generating circuit 101 through a scramble circuit 102, and parity data Qm of 4 symbols (one symbol is 8 bits) for correcting the C2 system error is generated. The word Wm of 24 symbols and the parity data Qm of 4 symbols are supplied to a C1 system parity generating circuit 103 through an interleave circuit 104, and parity data Pm of 4 symbols (one symbol is 8 bits) for correcting C1 system error is generated.

After that, subcode data of 8 bits is added to the word Wm of 24 symbols and data of 32 symbols which is constituted by the parity data Pm and Qm of 4 symbols, through a first one frame delay circuit 105. The subcode data and the data of 32 symbols are EFM (Eight to Fourteen Modulation) modulated. Margin bits of 3 bits are interposed between each symbol of 14 bits, and this combined data is modulated. A frame synchronizing signal of 24 bits is added to the combined modulated data. The data of 588 bits obtained in such a manner as described above is recorded on the disc as one frame.

In this case, the bit clock is 4.32 MHz, and the data is recorded on the disc at 136 μsec (7.35 kHz) per one frame. Also, for subcode data, one subcode frame is constituted of 98 frames and the data is recorded on the disc at 75 Hz (13.3 msec) per one subcode frame.

During reproduction, the disc reproducing device EFM demodulates the digitized data read from the compact disc and then separates it into the word component, including the parity data Pm and Qm, and the subcode data component. Among these components, the word component is supplied to a C1 system error correction circuit 106 through a second one frame delay circuit 107, as shown in FIG. 2, and error correction processing is performed on the basis of the parity data Pm.

After that, the word Wm of 24 symbols and the parity Qm of 4 symbols are supplied to a C2 system error correction circuit 108 through a deinterleave circuit 109, and the error correction processing is performed on the basis of the parity data Pm. The word Wm of 24 symbols is supplied to an A/D (digital/analog) conversion circuit system and analog signal processing circuit system (not shown) through a descramble circuit 110, and reproduced into an analog signal.

The subcode data component is constituted of 8 bit data called P, Q, R, S, T, U, V, and W per one frame, and, as described above, one subcode frame is constituted by 98 bits. For the subcode data, two bits (bit No. "0" and "1") at the top of one subcode frame are subcode frame synchronous patterns S0 and S1 and the remaining 96 bits are substantial data components.

The subcode data P is provided for identification of each successive recorded segment. For example, "1" shows the start and "0" continued play. The subcode data Q is called address data. In the program area (radius 25 mm to 58 mm) of a disc, they show a so-called music number or track number (TNO), a so-called phrase number (index), and a lapse of time. In the lead-in area (radius 23 mm to 25 mm) of a disc, they show so-called table of contents data (TOC data) for showing a start address for each segment of recorded data, such as music.

Other subcode data R to W of 6 bits are provided for recording color graphic image data at a current standard.

In the processing as described in FIG. 2, which is performed in the disc reproducing device, a read/write memory (hereinafter called RAM) is used. That is, the EFM modulated word components are successively written in the RAM. After the C2 system error correction processing, they are read from the RAM and output to the A/D conversion circuit system.

In this case, the address to be supplied to the RAM is classified into one of the following four kinds. These addresses are the Wr address for writing the EFM modulated data in the RAM, the C1 address for reading the C1 system data to detect an error of the C1 system from the data written in the RAM and for writing in and reading from the RAM to correct the detected erroneous data, the C2 address for reading the C2 system data to detect an error of the C2 system data from the data written in the RAM and for writing in and reading from the RAM to correct the detected erroneous data, and the Re address for reading the data from the RAM to output to the A/D conversion circuit system.

FIG. 3 is a diagram showing the conventional address generating means for generating each address of the Wr, C1, C2, and Re. In this case, to make the description easily understandable, the data in one frame is assumed to be 6 symbols of U0 to U5 and interleave processing also is assumed as a delay of one frame.

Each address described above is constituted of 4 bit frame addresses A0 to A3 and 3 bit symbol addresses A4 to A6. The symbol addresses A4 to A6 are generated by a symbol address generating circuit 115 consisting of counters 111 and 112, a correction symbol address register 113, and a selector 114.

In this case, the counter 111 indicates the symbol address of each symbol U0 to U5 at the generation of the Wr address, and has the values of 0 to 5. The correction symbol address register 113 indicates the symbol address of the symbols U0 to U5 where an error is detected by error detection of the C1 or C2 system.

The contents of one of the counters 111 and 112 and the correction symbol address register 113 is selected by the selector 114 according to the timing of each data processing and output.

The frame addresses A0 to A3 are generated from a circuit consisting of counters 116 and 117, a read-only memory (hereinafter referred as ROM) 118, arithmetic circuits 119 and 120, and a selector 121. In this case, the counter 116 is a hexadecimal counter indicating the frame address of each symbol U0 to U5 at the generation of the Wr address and resets each time 6 symbols U0 to U5 per frame are finished. The counter 117 is a hexadecimal counter indicating the frame address of each symbol U0 to U5 at the generation of the C1, C2, and Re and resets when error correction of one frame is finished. The ROM 118 inputs the symbol addresses A4 to A6 and outputs the fixed value N to be described later.

The arithmetic circuit 119 subtracts the contents B of the counter 117 from the contents A of the counter 116 and the arithmetic circuit 120 subtracts the fixed value N of the ROM 118 from the contents B of the counter 117.

In this case, the calculation is performed by a modulo of hexadecimal (16). For example, in the calculation of $B-2$, if $B=1$, the following value is obtained, $$B-2=15.$$

The contents A of the counter 116 become the frame address of Wr, the contents B of the counter 117 become the frame address of C1, the result of subtraction of the arithmetic circuit 120 becomes each frame address of C2 and Re and these addresses are selected by the selector 121 and output. In this case, each frame address of Wr, C1, C2, and Re is generated with relation to each symbol U0 to U5, as shown in FIG. 4.

The counter 116 counts the clock generated on the basis of the frame synchronizing signal of the EFM data reproduced from the disc, and generates the frame address of Wr. As a result, jitter occurs during the write-in processing into the RAM of the modulated word components on the basis of the contents A (frame address of Wr) of the counter 116.

The counters 117, 111, and 112 count the reference clock which is generated by a crystal on a fixed cycle. The counters 117, 111, and 112 also generate the frame addresses of C1, C2, and Re. Therefore, the frame address of Wr, which is generated by the counter 116, has a jitter component when compared with the frame address of C1, which is generated by the counter 117.

FIG. 5 shows a memory map of data in the RAM. In this map, the positions of the data specified by each address of Wr, C1, C2, and Re are shown as Wr, C1, C2, and Re, respectively. In this case, absorption of jitter for +4 frames and −3 frames is performed on the basis of the frame address [11] of Wr.

For this reason, in the initial state $A-4$ is preset in the counter 117 by the arithmetic circuit 119. Also, always $A-B$ is calculated and the speed of rotation of the disc is controlled by the arithmetic circuit 119 so that, $$A-B=4$$

when the value of $A-B$ becomes less than 0 or more than 9. Buffer-over is generated and the arithmetic circuit 119 outputs buffer-over signal OV1 to the counter 117. Accordingly, in the counter 117, $A-4$ is preset in the same manner, as in the initial state.

FIG. 5 shows the processing state obtained when the contents A of the counter 116 is [11] and the contents B of the counter 117 is [7]. EFM modulated data is written in the position shown with frame address [11] (indicated as Wr in the drawing). Also, write and read operations for error correction processing of the C1 system are performed at the position shown with frame address [7] (indicated as C1 in the drawing).

Further, write and read for error correction processing of C2 is performed at the position shown with frame address [B−6], [B−5], [B−4], [B−3], [B−2], and [B−1], that is [1], [2], [3], [4], [5], and [6] (indicated as C2 in the drawing) to the symbols U0 to U5. Also, reading of the data when error correction processing is finished is performed at the position shown with frame address [B−7], [B−6], [B−5], [B−4], [B'3], and [B−2], that is, [0], [1], [2], [3], [4], and [5] (indicated as Re in the drawing) to the symbols U0 to U5.

In this case, as in the disc reproducing device, when an optical pickup traces tracks formed on a compact disc and reads data, an objective lens, which is provided in the optical pickup as a pickup device, sometimes jumps in error from the track it is tracing at present to another track by a shock from outside, that is, a track jump occurs. When such a track jump occurs, conventionally the objective lens is controlled to automatically return to the original position by using the address data obtained in the subcode data so that reproducing operation is continued.

To describe more definitely, as shown in FIG. 6(a), it is assumed that an objective lens tracing the track N jumps to the track M at time ta by external vibration. As a result, the data of the track M is read through the objective lens, the distance to the original track N is calculated on the basis of the address data of the subcode data and the objective lens is moved to the original track N at time tb.

In this case, the data served for the C1 system error correction processing is varied, as shown in FIG. 6(b). In FIG. 6(b), the data is sent out in the order of U0, . . ., U5, 2·U0, . . . , 2·U5, 3·U0, . . . , 3·U5, . . . . In this case, if the objective lens jumps at the break point from the track N to the track M, errors are not detected in the C1 system.

When deinterleave processing is provided to the data, the data arrangement becomes as shown in FIG. 6(c) and when error correction of the C2 system is performed in this state, the error of the C2 system is detected in the frame (indicated with mark [X] in the drawing) where the data of the track N and the data of the track M are mixed. However, in the frame (indicated with mark [o] in the drawing) where the data of the track N and the data of the track M are not mixed, errors are not detected including the data of different tracks.

As described above, for the error correction of the C2 system in the frame where the data of the track N and the data of the track M are mixed, the possibility of error correction is high, and the muting processing of the data of this portion has generally been performed without performing error correction processing.

As a result, the audio signal becomes such as shown in FIG. 7(a). The audio signal obtained by reproducing the track M is causes an erroneous sound if it output. Therefore, practically, data obtained by reproducing the track M is muted, and, as shown in FIG. 7(b), the data read in the duration until the pickup returns to the original position after the track jump is muted.

When performing the operation of returning the pickup to the original position after the track jump, the detection as to whether track jump has occurred and whether the pickup has returned to the original position is performed by reading the address data of subcode data. For reading the address data of subcode data, it is necessary to read the subcode frame synchronizing signal generated from the subcode frame synchronizing patterns S0 and S1.

As shown in FIG. 8(a), therefore, if the subcode frame synchronizing signal can immediately be read at the time point when the pickup jumps in the track M, the pickup can return to the original track N in a short time, also as shown in FIG. 8(b), the muting period of audio signal can be shortened. However, it is very rare that track jump occurs at such an ideal timing. For example, as shown in FIG. 9(a), just after subcode frame synchronizing signal is generated at the time point when the pickup jumps in the track M or when an error is generated in the subcode data read after the pickup returns to the original track N, the muting period of the audio signal is much longer, as shown in FIG. 7(b).

Thus, an interruption in the sound arises, causing listeners to become uncomfortable.

As described above, in a conventional disc reproducing device, there is a problem in that data is muted during the period until a pickup returns to the original track when a track jump occurs, and a sound interval arises when the time required until the pickup returns to the original track is too long.

The present invention has been made in considering the matters described above and its object is to provide a very satisfactory disc reproducing device where no interruption occurs in the reproduction of data during the duration until the pickup returns to the original track after a the track jump.

SUMMARY OF THE INVENTION

It is, therefore, an object of the present invention to provide an erroneous track jump restoration apparatus for an optical record disc player which is able to rapidly correct an undesired track jump.

Another object of the present invention to provide an erroneous track jump restoration apparatus for an optical record disc player which is able to restore a track jump without yielding a discontinuity of reproduced data.

In order to achieve the above objects, an erroneous track jump restoration apparatus for an optical record disc player for reproducing data stored in a plurality of tracks connected in a continuous spiral or separated concentrical tracks according to the present invention includes a device for rotating the disc, an optical pickup device aligned with one of the tracks for reading the data from the track, the pickup, being subject to jump movement of alignment with the track into alignment with another track in response to movement of the apparatus, a buffer memory device temporarily storing successive portions of the data read from the track for delaying reproduction of the data for a predetermined time after the reading of the data, a track jump detection device for detecting movement of the pickup device into alignment with the other track and interrupting temporary storage of the data read from the other track by the buffer memory device, a drive device for moving the pickup device with respect to the device for reading data, and for changing the alignment of the pickup device from the other track to the one track in response to the track jump detection device, and an output device for substantially uninterrupted reproduction of only the data read by the pickup means when the pickup means was aligned with the one track.

According to the construction as described above, it is possible to prevent reading of the main information data memorized in the buffer memory device until the pickup device returns to the original track after the pickup device experiences the track jump, and to successively read from the memory means the main information data memorized in the memory means before the pickup device causes the track jump and the main information data after the pickup device returns to the original track. Thus, listeners do not miss data while the pickup returns to reproduction in the original track after a track jump occurs.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a drawing showing the relation of each symbol and address in the address generating means in the conventional disc reproducing device shown in FIG. 3;

FIG. 5 is a drawing showing a memory map of the buffer memory in the address generating means in the conventional disc reproducing device shown in FIG. 3;

FIGS. 6 and 7 are drawings for describing the operation of the conventional disc reproducing device shown in FIG. 3.

FIG. 24 is a drawing showing the relation of each symbol and address in the second embodiment shown in FIG. 23;

FIG. 25 is a drawing showing a memory map of the buffer memory in the second embodiment shown in FIG. 23;

FIG. 27 is a drawing showing the memory contents of the buffer memory for describing the operation of the second embodiment shown in FIG. 23;

FIG. 29 is a drawing showing the relation of each symbol and address in the third embodiment shown in FIG. 28;

FIG. 30 is a drawing showing a memory map of the buffer memory in the third embodiment shown in FIG. 28;

FIG. 31 is a timing chart for describing the operation of the third embodiment shown in FIG. 28;

FIG. 32 is a drawing showing the memory contents of the buffer memory for describing the operation of the third embodiment shown in FIG. 28;

DESCRIPTION OF THE PREFERRED EMBODIMENTS

Figure 1:
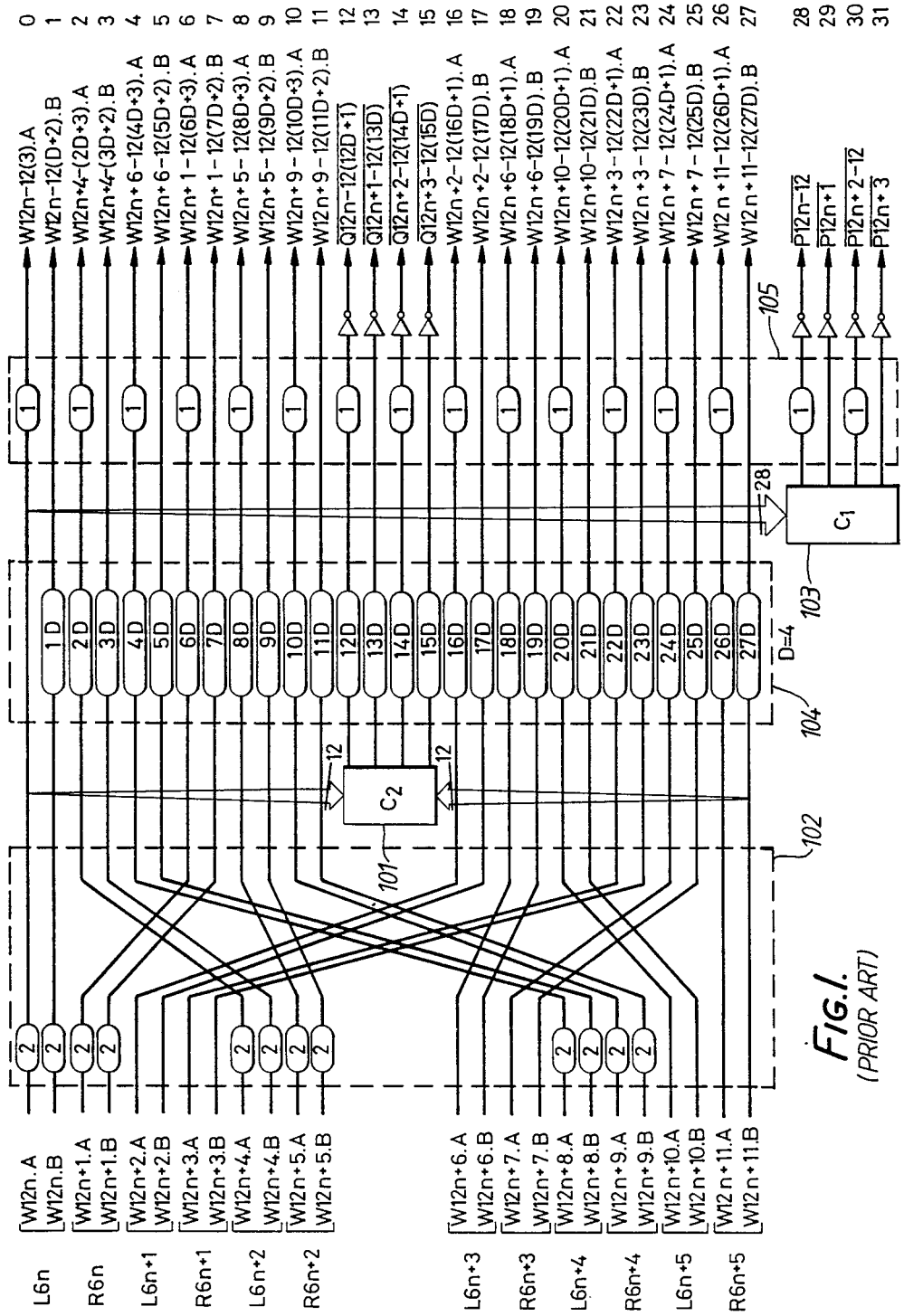
FIG. 1 is a block diagram showing the generating means for data to be recorded on a compact disc.
Figure 2:
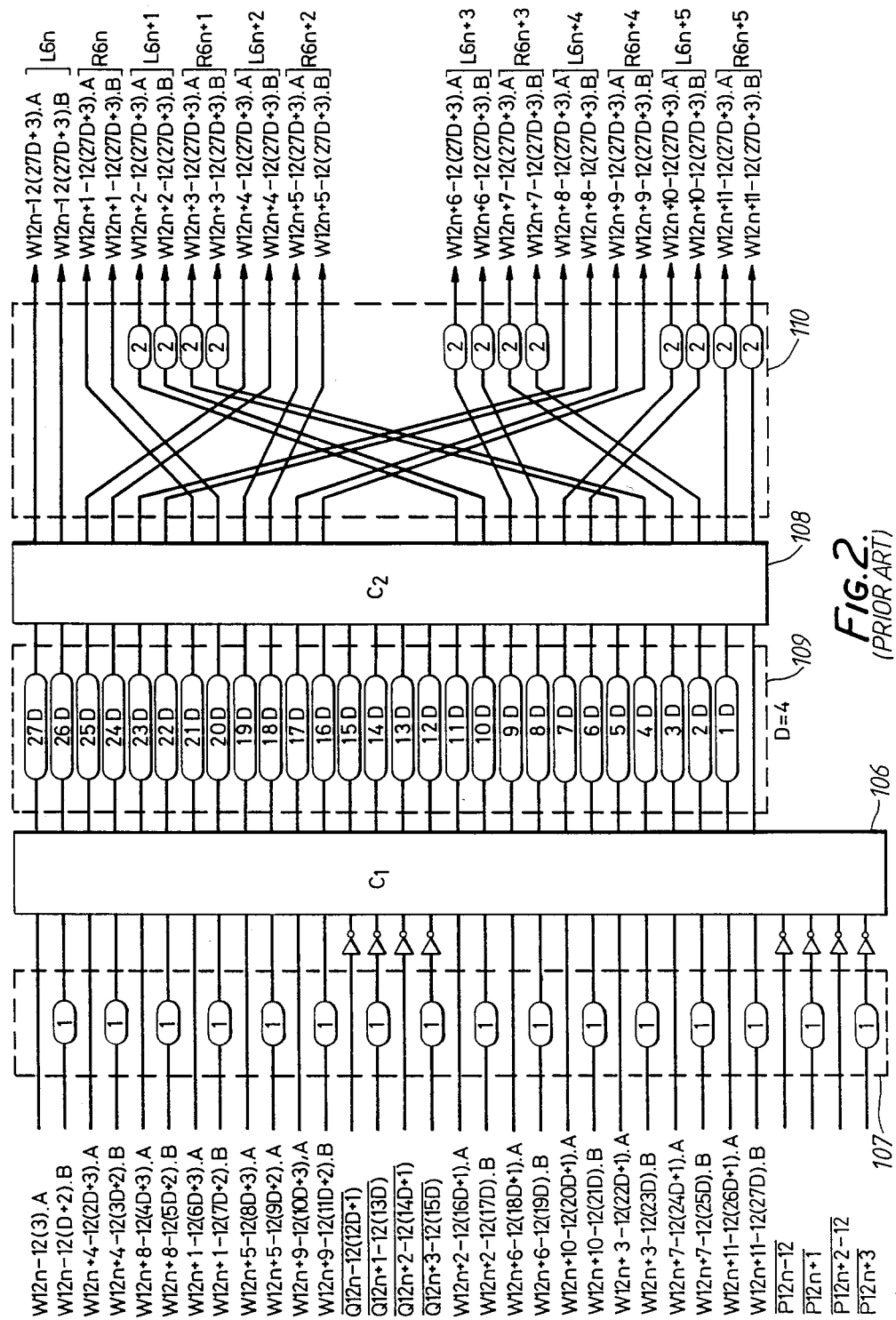
FIG. 2 is a block diagram showing the processing means for data read from a compact disc.
Figure 3:
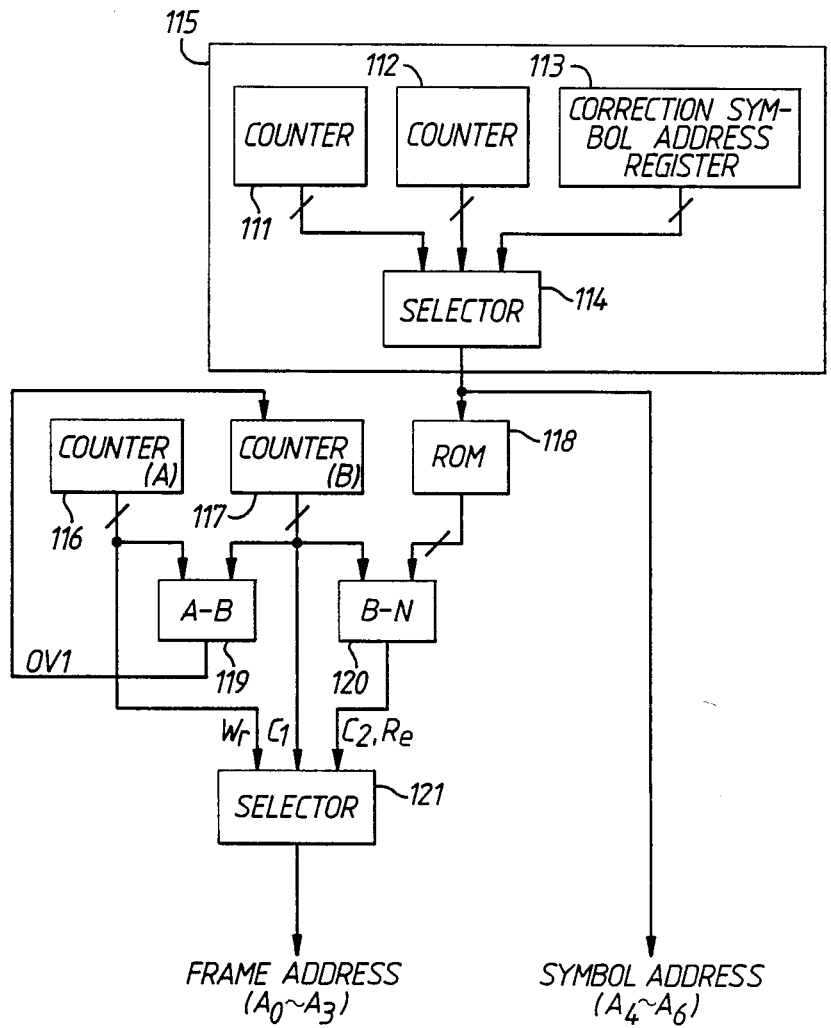
FIG. 3 is a block diagram showing the address generating means used in conventional disc reproducing devices.
Figure 8:
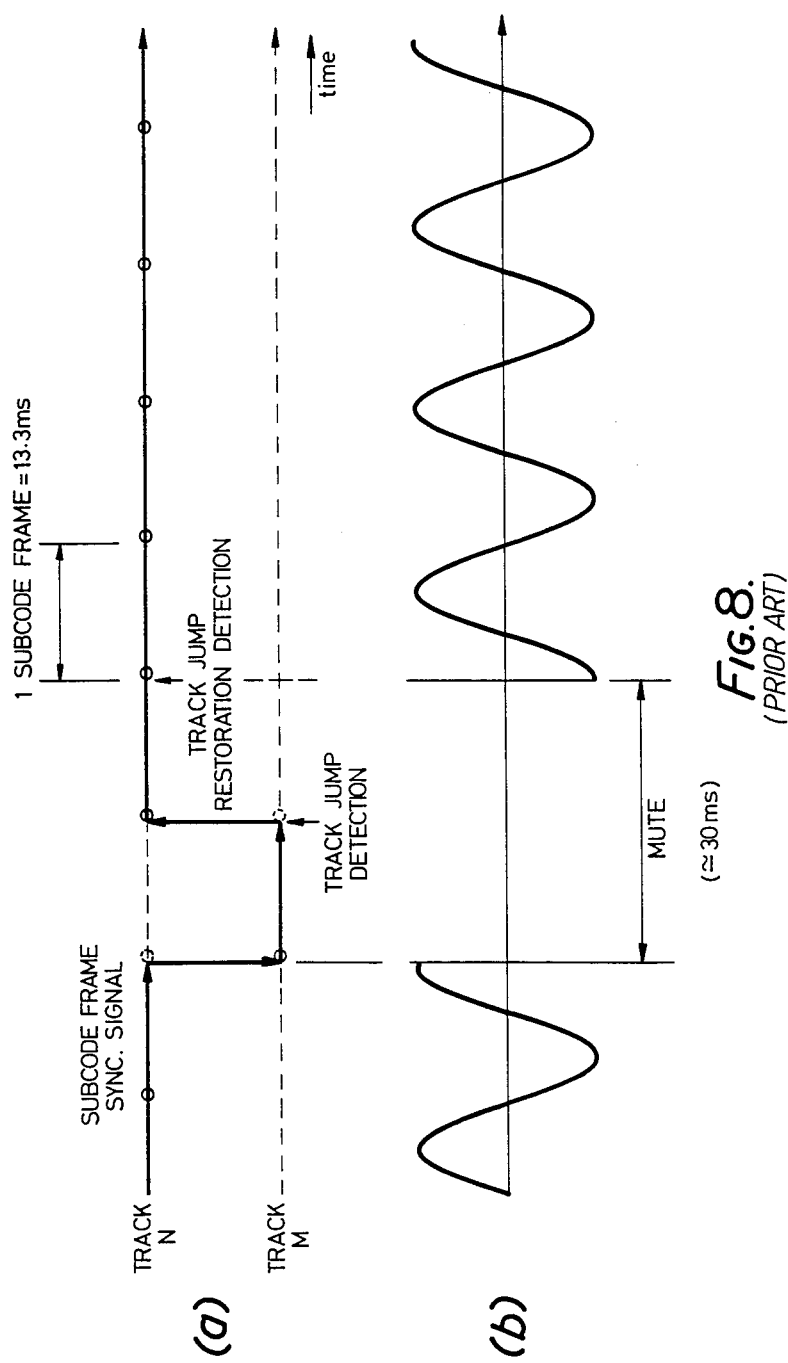
FIGS. 8 and 9 are timing charts for describing problems of conventional disc reproducing device shown in FIG. 3.
Figure 9:
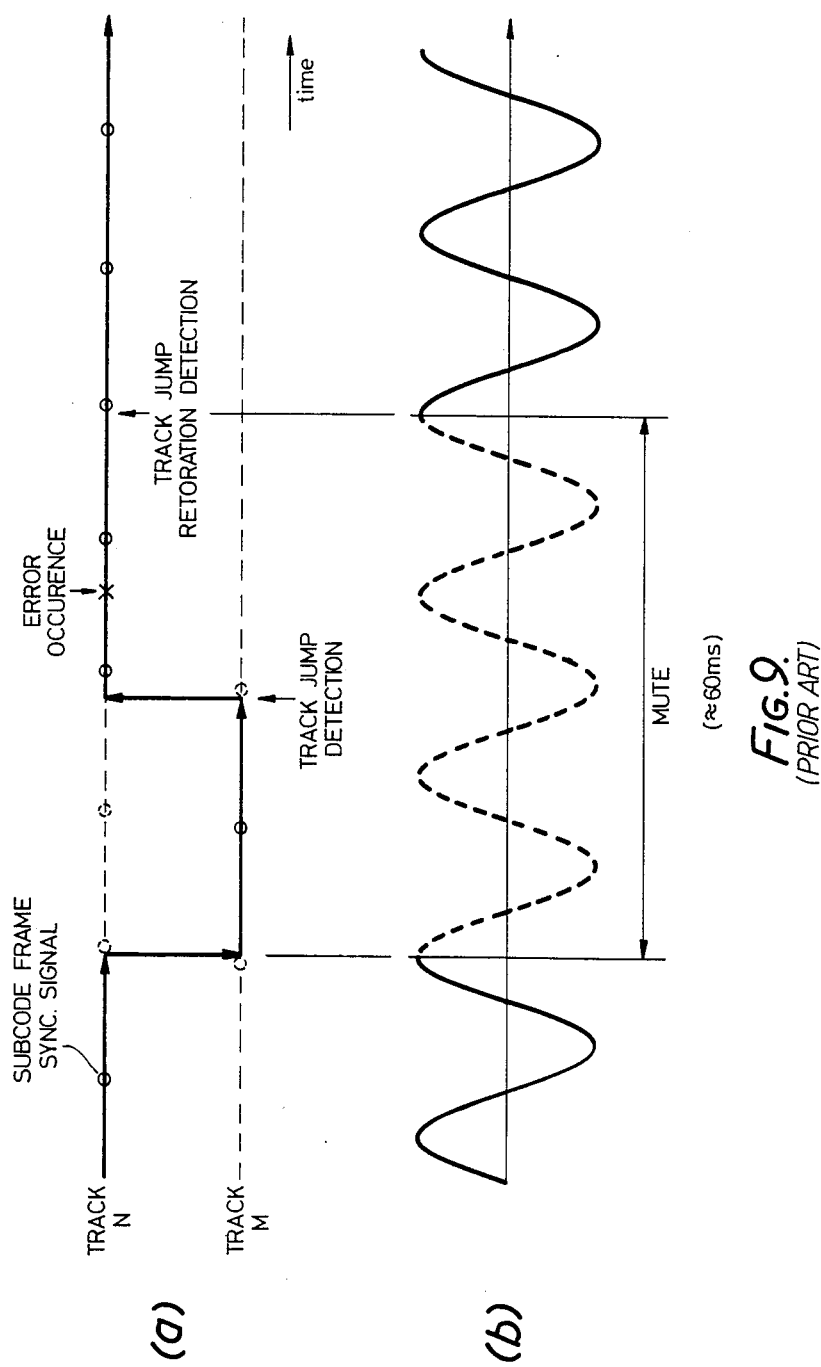

The present invention will be described in detail with reference to the drawings, i.e., FIGS. 10 through 39. Throughout the drawings, reference numerals or letters used in FIGS. 1 to 9 will be used to designate like or equivalent elements for simplicity of explanation.

Figure 10:
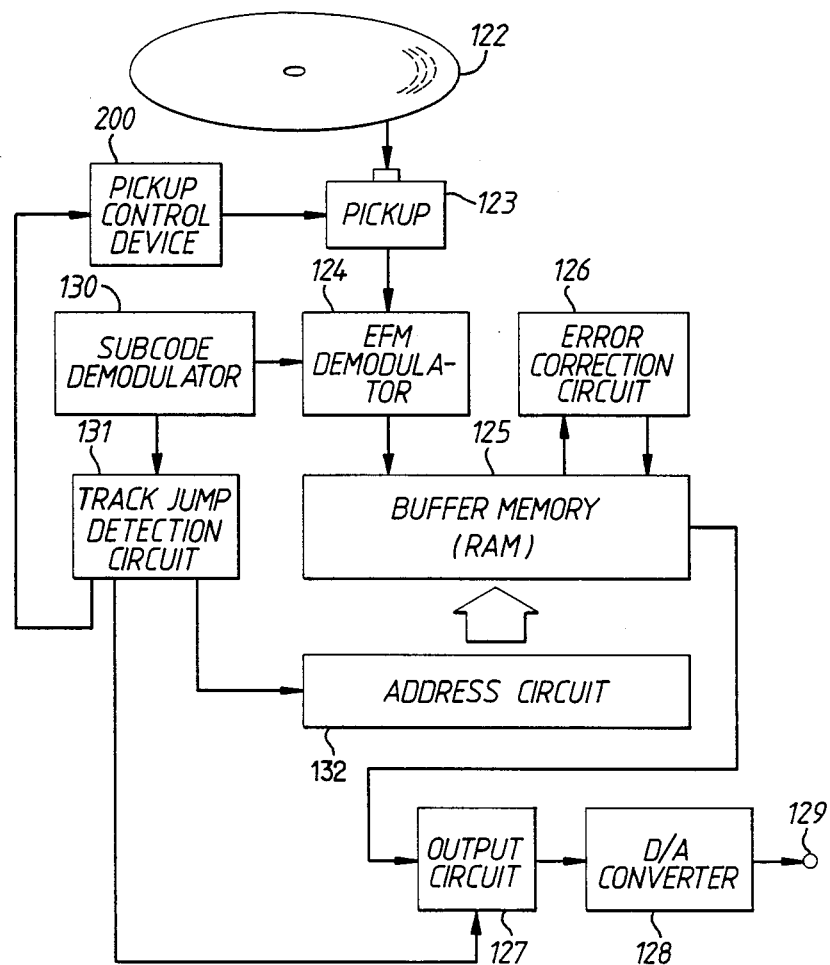
FIG. 10 is a block diagram showing an embodiment of an erroneous track jump restoration apparatus for an optical record disc player according to the present invention.
Figure 11:
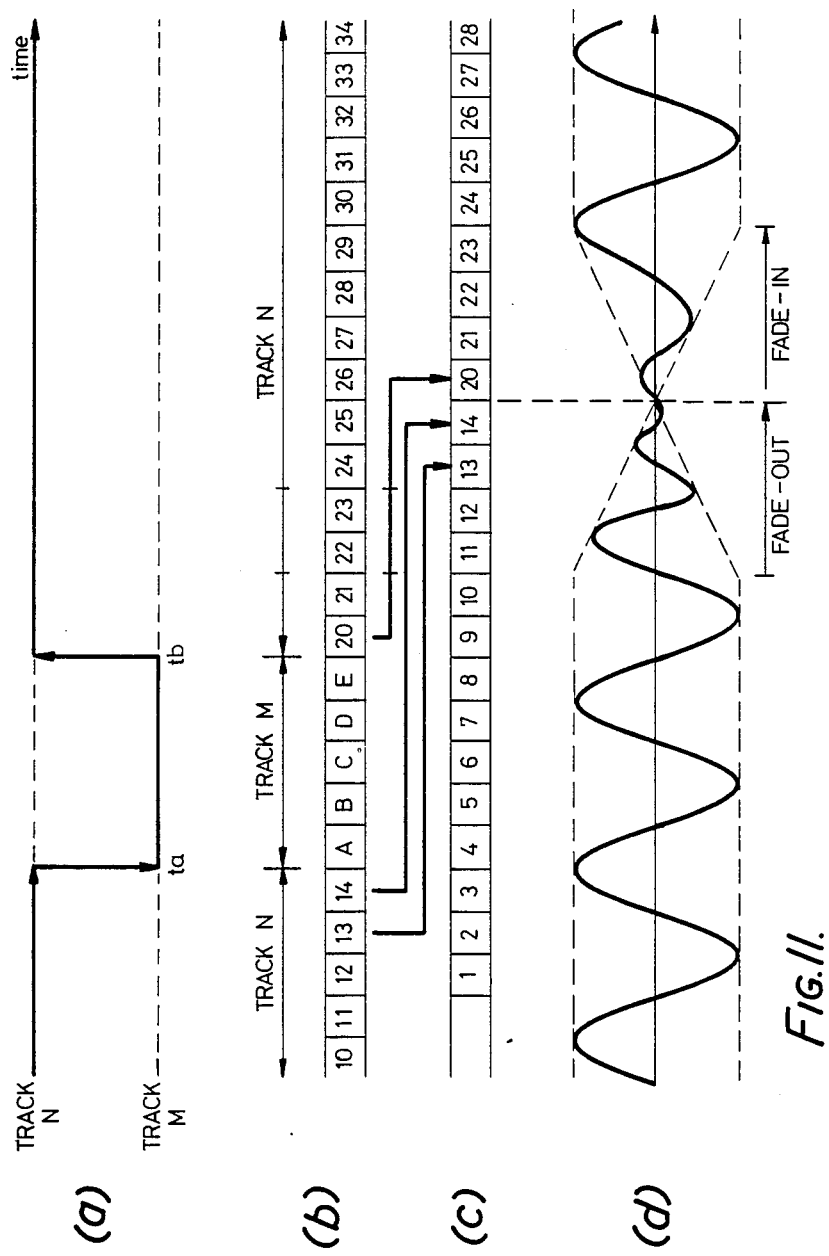
FIG. 11 is a timing diagram for describing the operation of the embodiment of FIG. 10.

Referring now to FIG. 10, a first embodiment of the erroneous track jump restoration apparatus for an optical record disc player according to the present invention will be described in detail. FIG. 10, on recorded data a disc 122 is read by an optical pickup 123. The data read by the optical pickup 123 is applied to an EFM demodulation circuit 124. The EFM demodulation circuit 124 carries out an EFM demodulation for the data. The EFM demodulation circuit 124 also discriminates a word component containing parity data Pm and Qm and a subcode data component from the read data.

Among these components, the word component is written in a buffer memory 125 constistuted by a RAM (Random Access Memory), supplied to a correction circuit 16 after the time axis jitter component is absorbed, and error correction processing of C2 and C1 is performed. The data where error correction processing is finished are successively written in the buffer memory 125 again.

The buffer memory 125 has the data memory capacity of more than the data quantity reproduced within the time required until an objective lens (not shown in the drawing) of the optical pickup 123 returns to the original position after the optical pickup 123 causes the track jump. This buffer memory 125 reads out the written data successively in an output circuit 127 in the condition that the time of more than the time required until the objective lens returns to the original track after the objective lens causes the track jump is elapsed. That is, the buffer memory 125 has the buffer capacity of more than the time required until the objective lens returns to the original track after the objective lens causes the track jump.

The data read out in the output circuit 127 is supplied to an analog reproduction system (not shown in the drawing) for reproduction through a D/A conversion circuit 128 and an output terminal 129.

The subcode data component output from the EFM demodulation circuit 124 is modulated by a subcode demodulation circuit 130 and them the address data component is supplied to a track jump detection circuit 131 and the track jump is detected. The track jump detection circuit 131 controls, as described, an address circuit 132 for generating the read/write address and the output circuit 127 when a track jump is detected. Further the track jump detection circuit 131 calculates a number of tracks between one track which has been read by the pickup 123 before an occurence of the track jump and another track which is presently read by the pickup 123 after the occurrence of the track jump. A calculated output is applied to a pickup control device 200 so that the objective lens in the pickup 123 is returned to the one track which has been read by the pickup 123 before the occurence of the track jump.

That is, as shown in FIG. 11(a), it is assumed that track jump occurs to the track M at time ta in the state of reproduction of the track N. After that, the objective lens returns to the original track N at time tb. Thus, as shown in FIG. 11(b), the data to be written in the buffer memory 125 becomes the recording data of the track N before time ta, the recording data of the track M during time ta to tb, and the recording data of the track N after time tb.

As shown in FIG. 11(c), the address circuit 132 produces the Re address so as to read the data written in the buffer memory 125 by delaying a fixed quantity (that is, more than the time required until the objective lens returns to the original track after the objective lens causes the track jump). However, the address circuit 132 is operated so that the address circuit 132 generates the Re address for the data reproduced in the duration until the objective lens returns to the original track after the objective lens has experienced a track jump, that is, the data of the frames A to E of the track M, but it generates the R address for the data after the frame 20 to be obtained by reproducing the track N again.

For this reason, the data of the frame 14, which is written in the buffer memory 125 before the objective lens causes the track jump and the data of the frame 20, which is written in the buffer memory 125 after the objective lens returns to the original track, are continuously read out.

On the other hand, the output circuit 127 is operated to fade out the data before 4 frames of the data of the frame 14, which are read from the buffer memory 125 corresponding to the detection signal from the track jump detection circuit 131 to the data of the frame 14 and fade in the data the frame 20, which is read from the buffer memory 125 to the data of the frame 23 after 4 frames.

As the result, as shown in FIG. 11(d), the audio signal obtained from the output terminal 129 is faded out or in before and after the data of the frames 14 and 20, which are read from the buffer memory 125, and the data before the track jump and the data after track jump can be connected.

Therefore, according to the construction as described above, undesired sound interruption as in conventional devices, can be avoided and a track jump may not be noticed by listeners.

Figure 12:
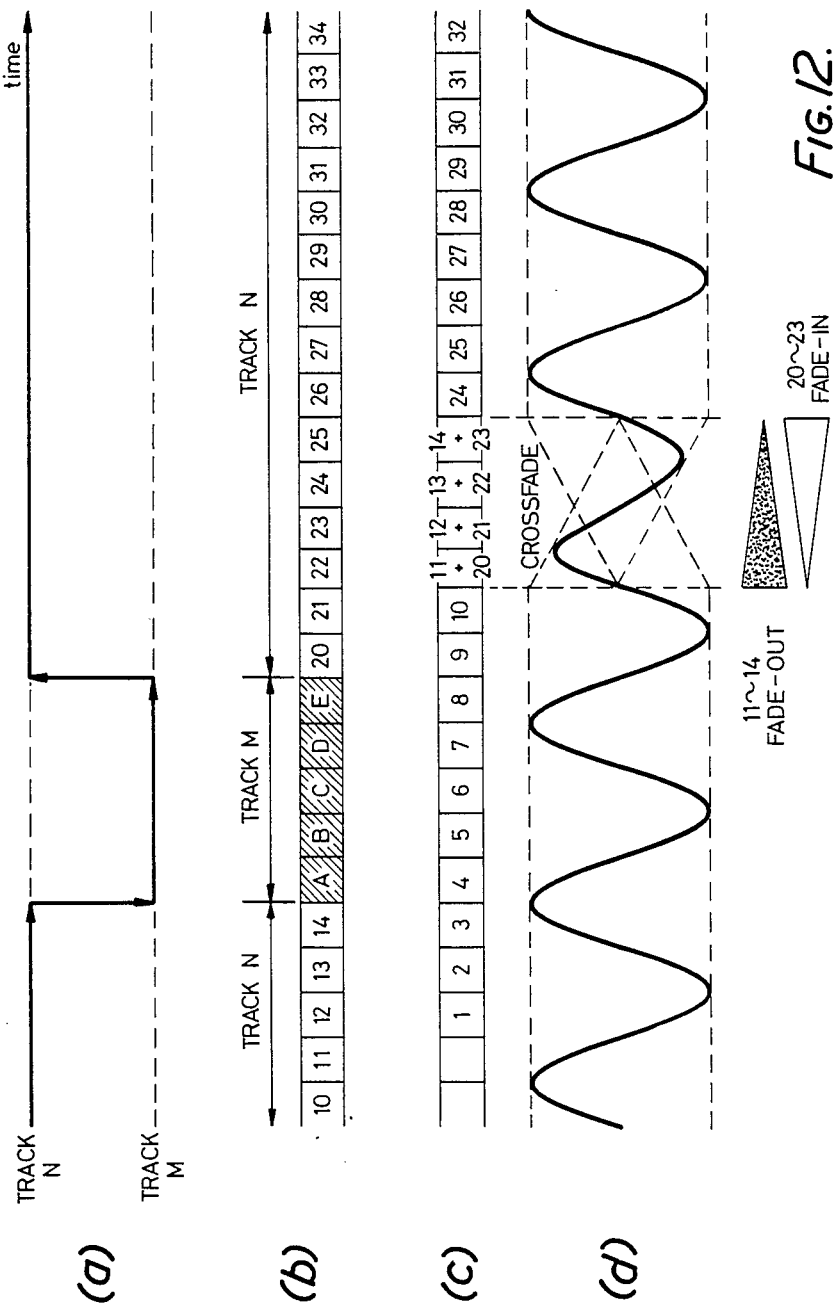
FIG. 12 is a timing diagram showing a modification of the operation of the embodiment of FIG. 10.

In the embodiment described above, fade-in and fade-out are provided before and after the connection portion of the data before the track jump and the data after the track jump. However, as shown in FIG. 12, the data before the track jump and the data after the track jump may be added, that is, a so-called cross fade may be provided. In this manner, connection of data can be performed smoothly and a satisfactory sound effect can be obtained.

Referring now to FIGS. 13 to 20, the operation of the above embodiment, as shown in FIG. 10, will be explained in more detail.

Now, it is assumed a case in which a track jump of a pickup device from a track N to to a track M erroneously occurs at the time ta, and thereafter the pickup device returns to the original track N at the time tb. Then reproduced data of the track N is written in the buffer memory 125 before the track jump at the time ta. Reproduced data of the track M is written in the buffer memory 125 during the times ta and tb. And again the reproduced data of the track N is written in the buffer memory 125 after the restoration of the erroneous track jump at the time tb.

Figure 13:
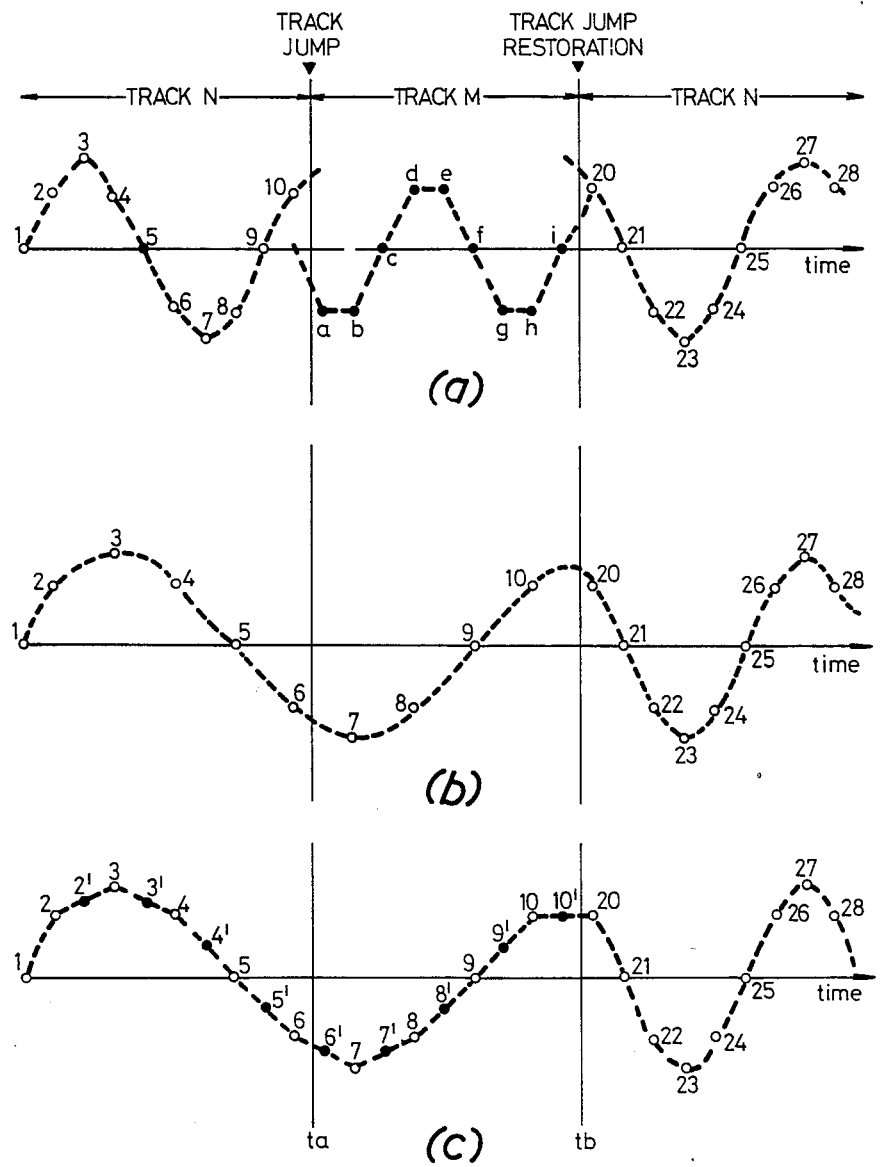
FIGS. 13 to 15 are drawings describing the operation of the invention.

In this arrangement, when reading the contents of the buffer memory 125 from the address circuit 132 from generating the Re address by the ordinary sampling frequency, record signals of the track N (the sample points are shown by numerals 1, 2, 3, etc. in FIG. 13) and record signals of the track M (the sampling points are shown by letters a, b, c, etc. in FIG. 13) are interposed as shown in FIG. 13(a).

The audio signals of the track M has been so far provided with muting, but in this embodiment, reproduced data of track M written in the buffer memory 125 as shown in FIG. 13(b) is not read, but by lowering the sampling frequency of Re address for reading the reproduced data of the track N written in the buffer memory 125 before the track jump occurs, the interval in which the reproduced data of track M should be read is interpolated by the reproduced data of the track N obtained before the track jump occurs.

Such Re address control is performed in a manner that a first detection signal showing that track jump occurs which is output from the track jump detection circuit 131, and a second detection signal showing that the pickup device returns to the original track, are received by the address circuit 132. In this case, the address circuit 132 is so designed that, for the memory data corresponding to the period between the generation of the first detection signal and the generation of the second detection signal, the sampling frequency of Re address for reading the memory data is decreased to ½ of the ordinary sampling frequency.

· In this manner, after returning to the original track, in the address circuit 132, the sampling frequency of Re address is returned to the ordinary value.

When interpolating the interval of the reproduced data of track M with the reproduced data of the track N obtained before the track jump by decreasing the sampling frequency of Re address as mentioned above, as shown in FIG. 13(c), the relationship between data of each sampling point 2 to 20 with the data (shown with O in the drawing) produced by an average value correction system or by a pre-substitute correction system, as examples, allows the sampling frequency of the Re address to remain substantially the same.

Figure 14:
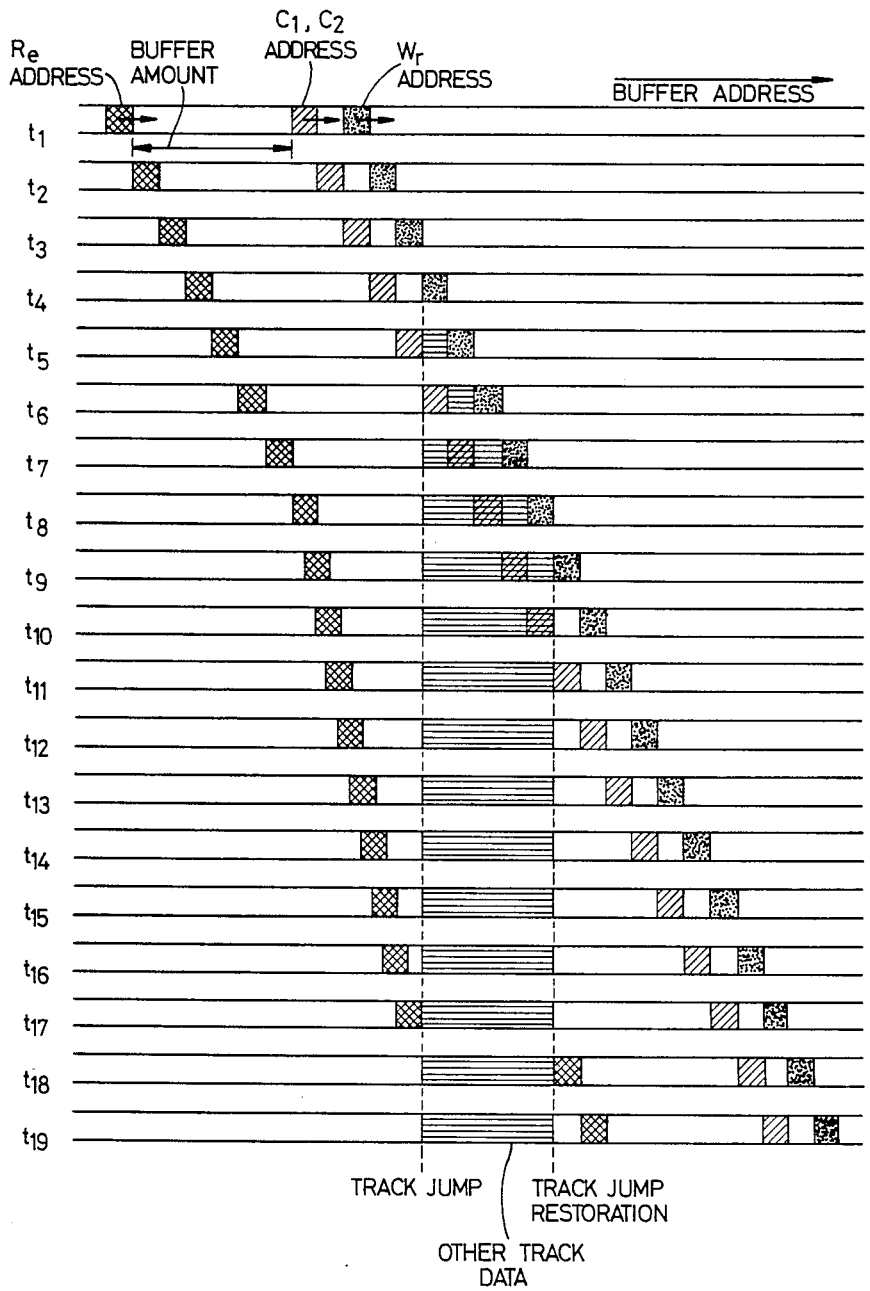

The address circuit 132, as mentioned before, controls the buffer memory 125 by generating a Wr address, C1, C2 addresses, and the condition of each address of Wr, C1, C2 and Re when the track jump occurs is shown in FIG. 14.

In other words, at the time t1 to t3 when the track jump does not occur, each address of Wr, C1, C2, and Re is generated as usual by the prescribed buffer quantity. An assumption is made that at time t4 the track jump occurs and at time ta return to the original track is made. Then in this case, each address of Wr, C1, C2, and Re is generated as usual until the time t18 and at time t19, when return to the original track is made, that is, in the period from the condition where the second detection signal is generated from the track jump detection circuit 131 to the time t17 to which the Re address approaches to data memory address of the other track due to the track jump, the address circuit 132 delays the proceeding of the Re address. That means it decreases the sampling frequency and compensates for the read interval of the other track.

After this, at time t18, the address circuit 132 stops reading the data of the other track by generating Re address by means of jumping the address in the region where the data of other track is memorized, and thereafter generates each address of Wr, C1, C2, and Re in the usual manner.

Figure 15:
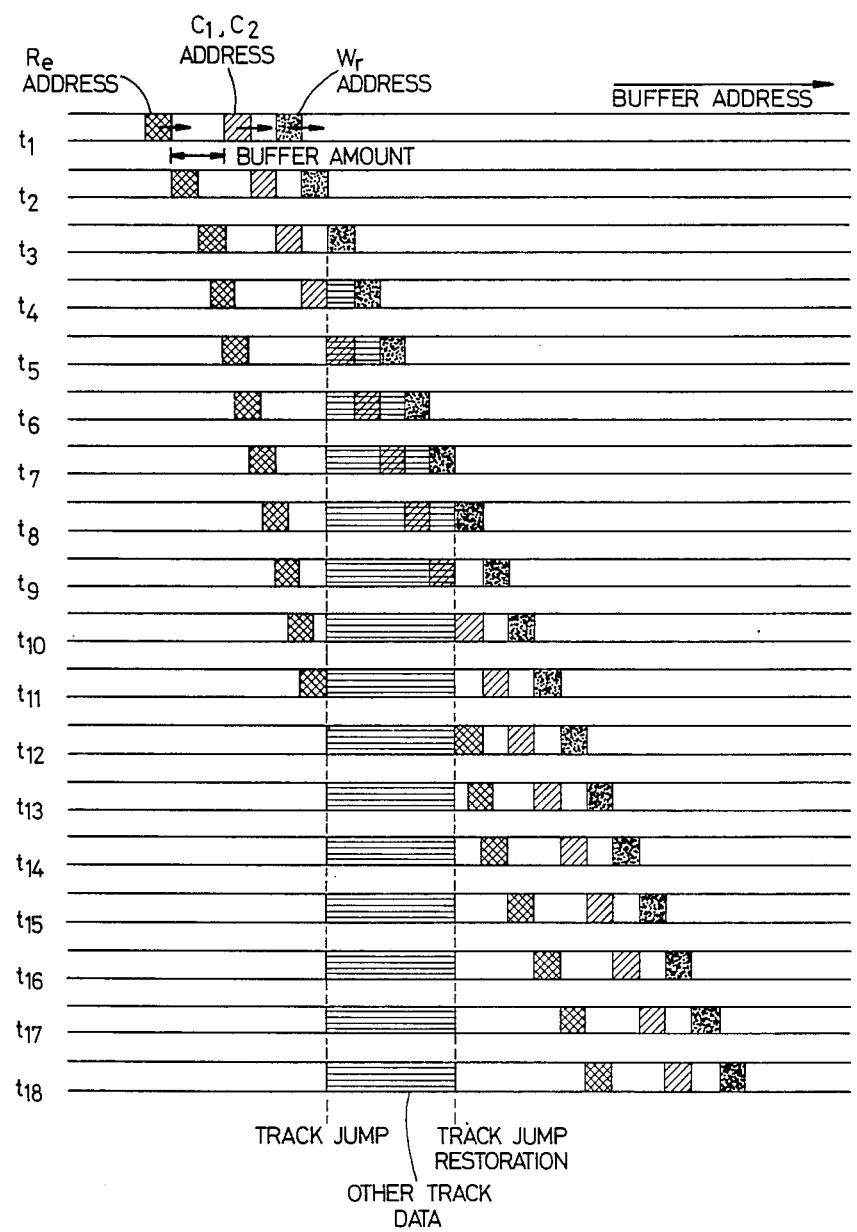

In this case, the operation may be described as follows: as shown in FIG. 15, in the condition that the track jump occurs (time t4), the sampling frequency of Re address is decreased, the address in the region where the data of the other track is memorized (time tb) is jumped, and at time t14 at which the return to the original track is completed and the buffer capacity returns to the condition before the track jump, the sampling frequency of Re address is returned to the original condition.

In the above example, the sampling frequency of Re address is decreased to ½ of the ordinary value, but it is a matter of course that it can be properly changed according to the time required from the the track jump to the return to the original track. For example, when the time required from the track jump to the return to the original track is short, interpolation of the time can be made with a small quantity of data, so that a slight decrease of the sampling frequency as compared to the ordinary value will be enough. On the contrary, when the time is long, it may be necessary to decrease the sampling frequency markedly below the usual frequency.

Figure 16:
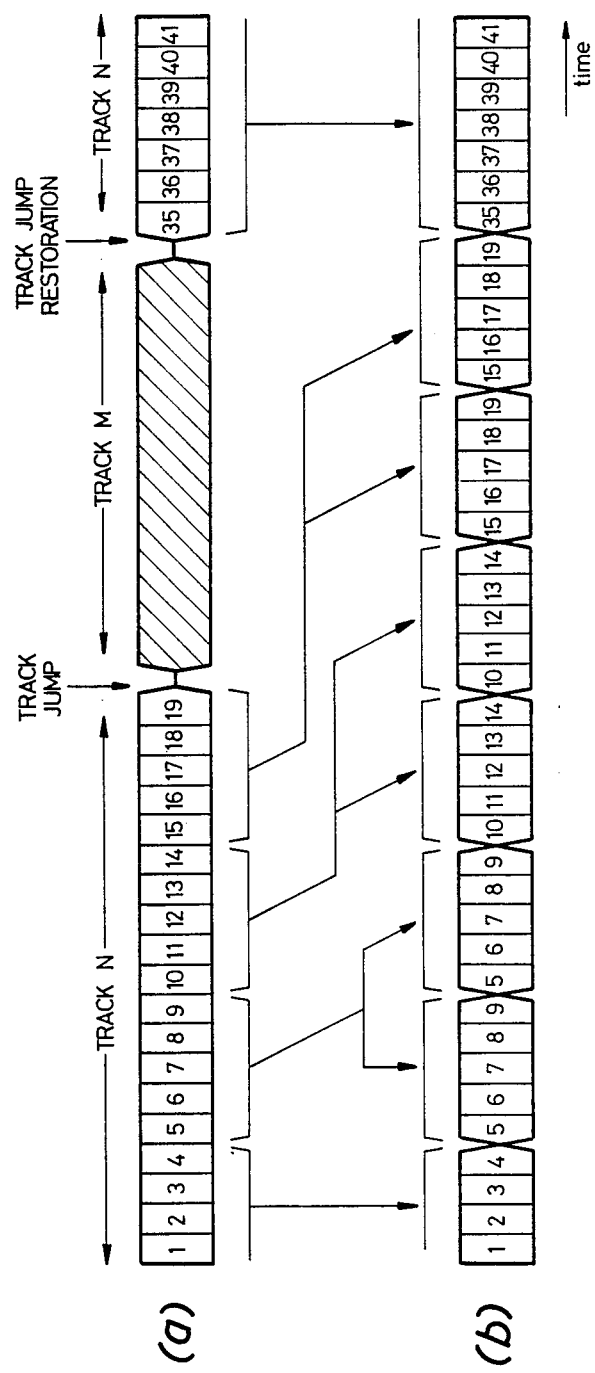
FIGS. 16 and 17 are drawings explaining other operations of the invention.
Figure 17:
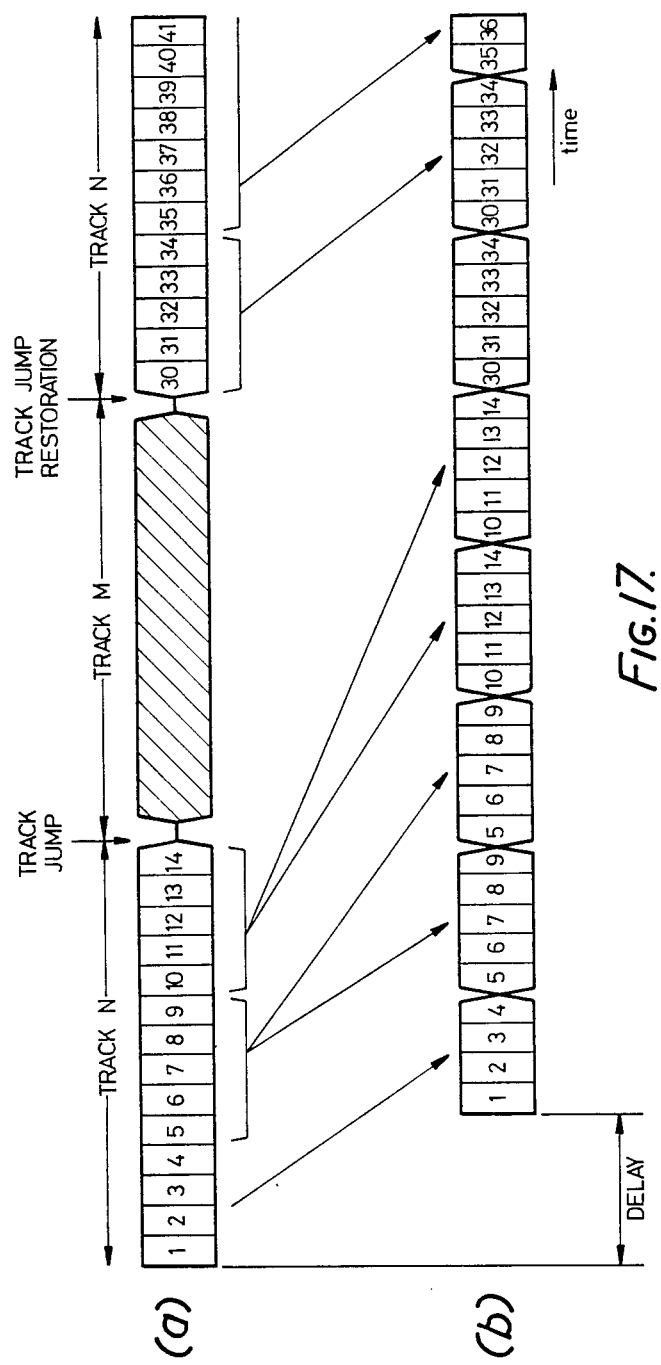
Figure 18:
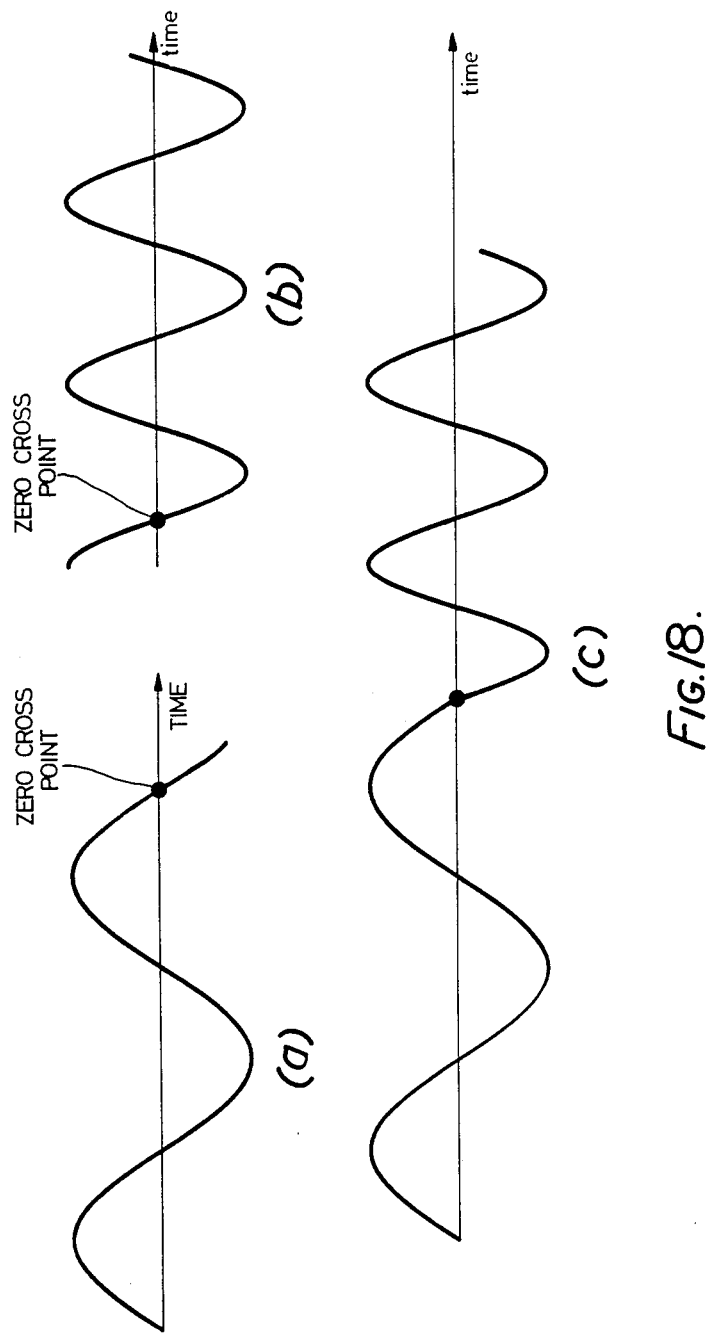
FIGS. 18 to 20 are waveform diagrams each explaining the operation of output circuits of the invention.
Figure 19:
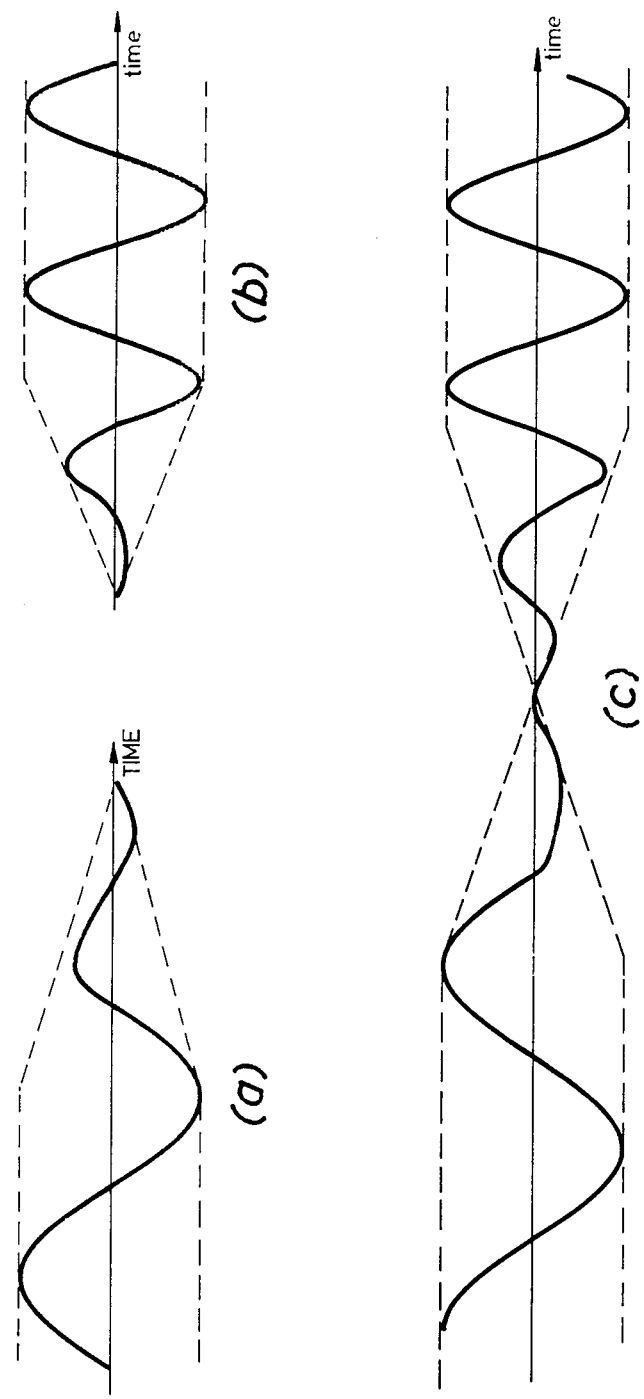
Figure 20:
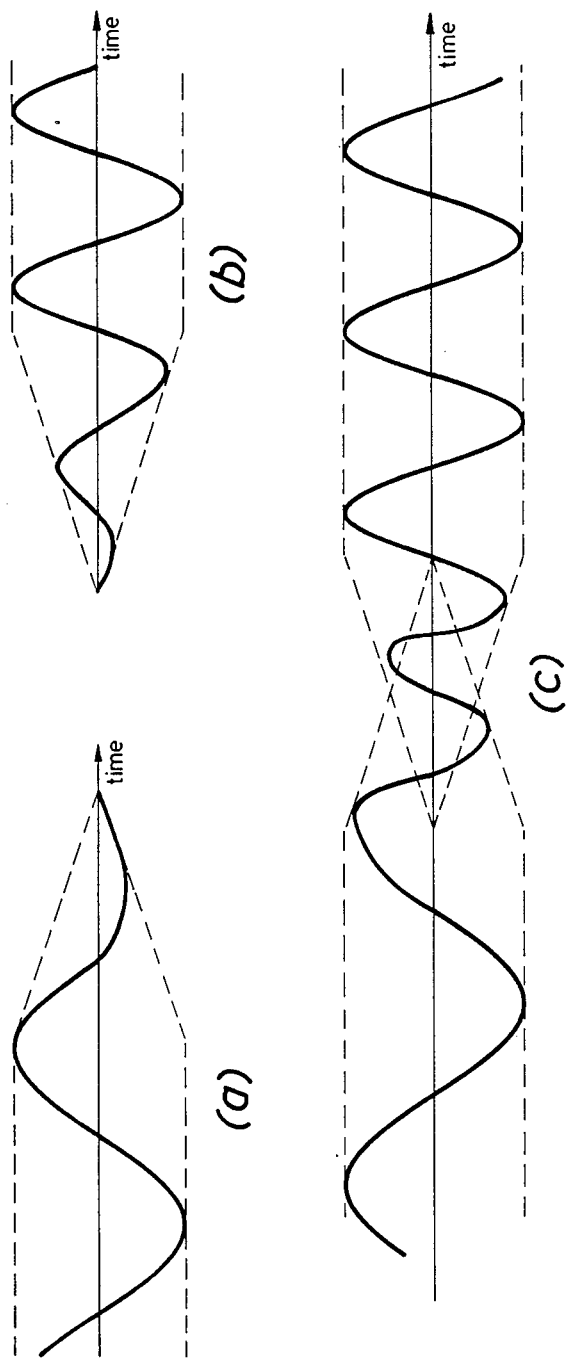

FIG. 16 shows the other example in which the data missed in the interval from the track jump to the return to the original track are eliminated. As shown in FIG. 16(a) when data are written in the buffer memory 125, the portion with slant lines in the drawing is the data of the track M, that is, it is considered to be the missed data. In this case, if the consideration is made by neglecting the delay by the buffer memory 125, FIG. 16(b) represents the case that the data portion of the track M (missed data) are interpolated by generating the Re address so that the data 10 to 14 and 15 to 19 memorized in the buffer memory 125 before the track jump occurs are each read twice.

The operation may be described as follows: when data are written in the buffer memory 125 as shown in FIG. 17(a), the Re address is generated so that the address circuit twice reads the data 5 to 9 and 10 to 14 memorized in the buffer memory 125 before the track jump occurs, and data 30 to 34 memorized in the buffer memory 125 after return to the original track as shown in FIG. 17(b), and eliminates the data portion (missed data) of the track M.

Therein, depending on the data missing time, the number of repetition and data length of before and after the missed data may be changed properly.

The output circuit 127 is so designed as to receive first and a second detection signals from the track jump detection circuit 131, and to control the data read from the buffer memory 125. The data is controlled so that zero cross points of the audio signal before the track jump, as shown in FIG. 18(a), from the D/A conversion circuit 128 and zero cross points of the audio signal after return to the original track, as shown in FIG. 18(b) can be continuously joined, as shown in FIG. 18(c). This makes the sound more natural to a listener.

In this case, the operation may be modified so that the data read from the buffer memory 125 are controlled in a manner that the audio signal before the track jump is provided with fade-out as shown in FIG. 19(a), and the audio signal after return to the original track is provided with fade-in as shown in FIG. 19(b). Both audio signals the are joined, as shown in FIG. 19(c).

Further, the operation can also be modified so that the data read from the buffer memory 125 are controlled in a manner that the audio signal before the track jump is provided with fade-out, as shown in FIG. 20(a), and the audio signal after return to the original track is provided with fade-in, as shown in FIG. 20(b). Both the audio signals are joined in cross-fade, as shown in FIG. 20(c).

Figure 21:
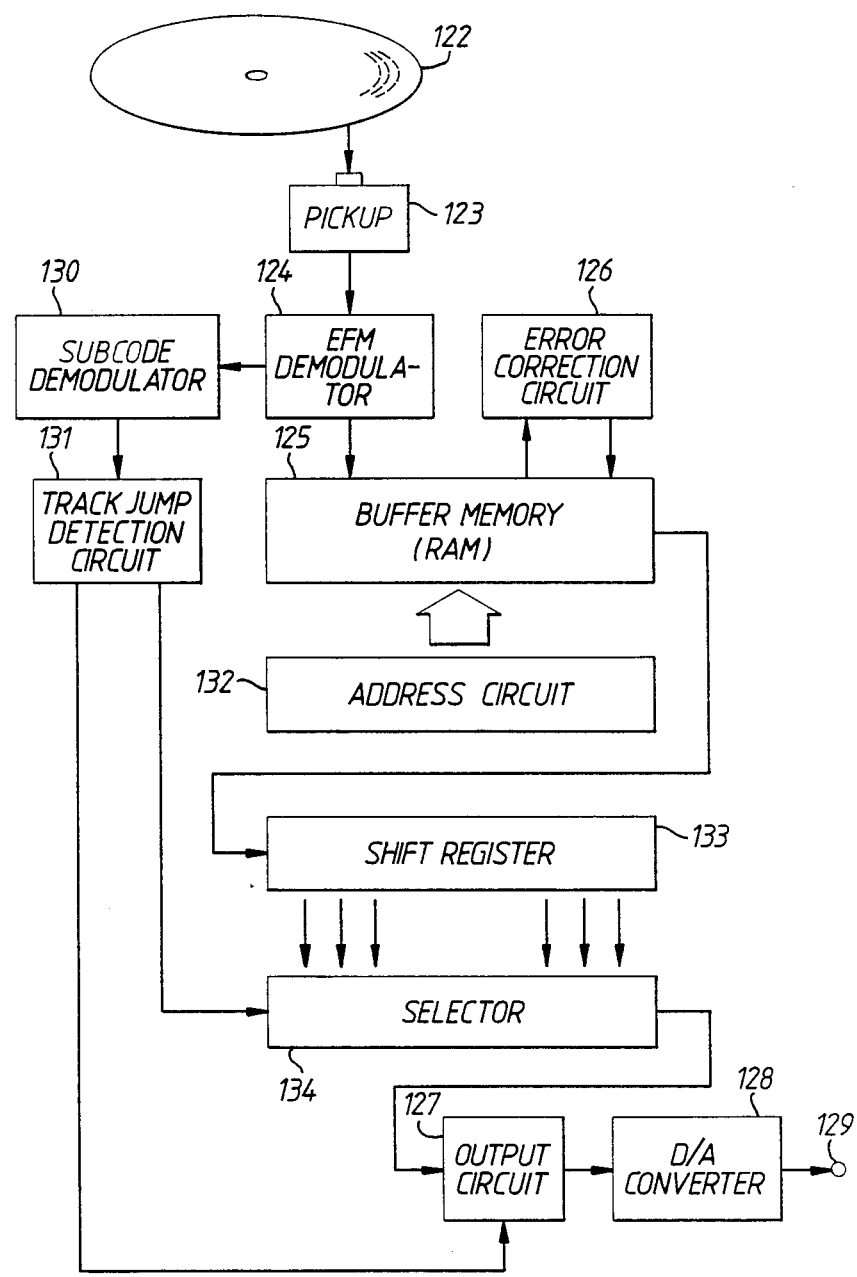
FIG. 21 is a block diagram showing a modification of the embodiment shown in FIG. 10.
Figure 22:
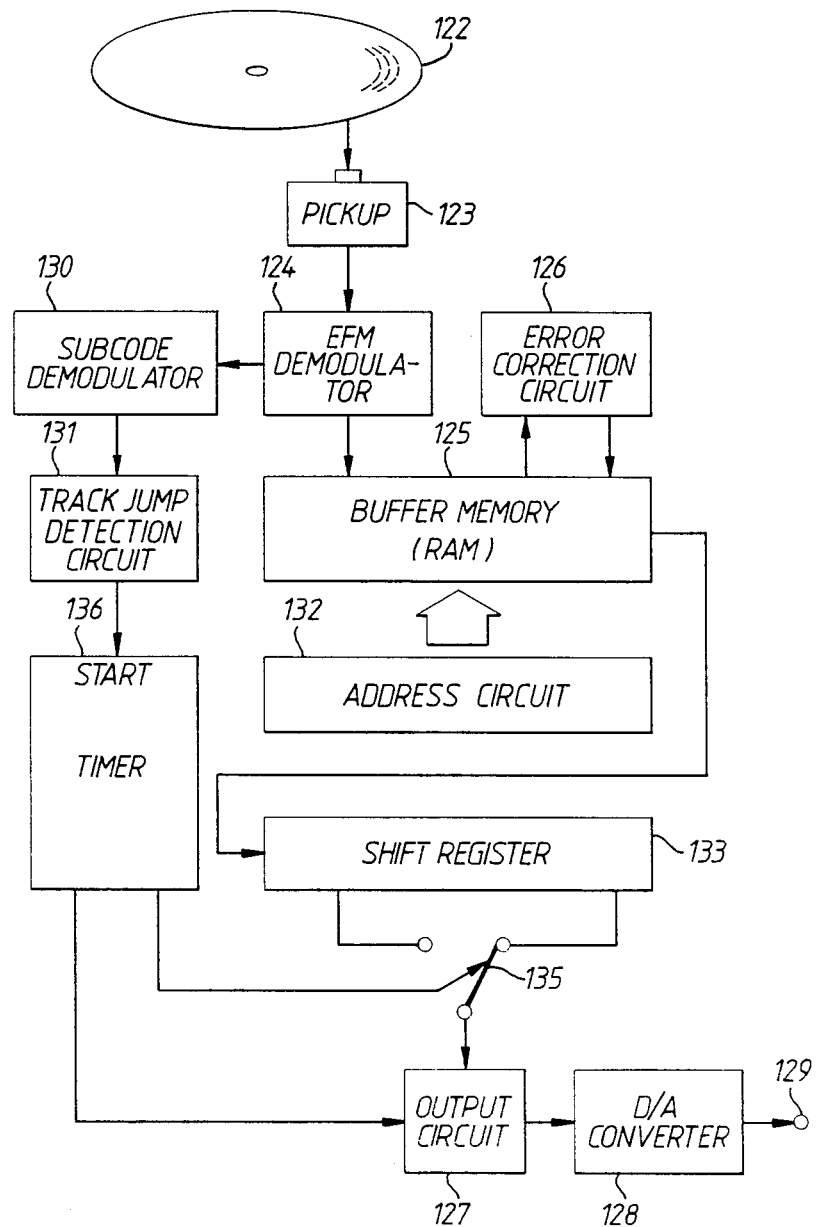
FIG. 22 is a block diagram showing another modification of the embodiment shown in FIG. 10.

FIGS. 21 and 22 show the modifications of the embodiment above described and shown in FIG. 10, respectively. In a device shown in FIG. 21, a buffer memory 125 is used for absorbing jitter and for correcting errors, in which the operation for delaying data for more than the time required until an objective lens returns to the original track after the objective lens experiences the track jump is performed by a shift register 133 and a selector 134.

The data read by the Re address from the buffer memory 125 is supplied to the shift register 133 and successively shifted. The whole shift quantity of the shift register 133 can store the data of more than the data quantity reproduced within the time required until an objective lens returns to the original track after it undergoes the track jump.

Usually, the data shifted by the shift register 133 are supplied successively to an output circuit 127 through the selector 134. Also, when the track jump occurs, the selector 134 abstracts from the shift register 133 the data read before the objective lens cause the track jump and the data read after the objective lens cause the track jump, respectively. According to the detection signal from the track jump detection circuit 131, the selector 134 connects these two data, and outputs to the output circuit 127.

According to the construction as described above, it is unnecessary to increase the capacity of the buffer memory 125 and perform an address operation, and the circuit can be made small and simple.

In a device shown in FIG. 22, usually data are abstracted from the specified position of a shift register 133 through a switch 135 and supplied to an output circuit 127. When the track jump occurs, the switch 135 is changed over only for the fixed time set by a timer 136 and the data is abstracted from the position before the specified position of the shift register 133 so that the data read before the track jump is connected with the data obtained after the objective lens returns to the original track. In this case, the fixed time set by the timer 136 is sufficient to avoid an unnaturalness at the data connection portion so that the track jump is not noticed by listeners.

According to the construction as described above, the data delayed by the fixed quantity is connected to the data obtained before the track jump irrespective of the time required until the objective lens returns to the original track after a track jump occurs. No arithmetic processing of addresses is required and the construction is therefore simplified. Also, the track jump is detected by a change of tracking error signal without the need to read subcode data, and the timer 136 can be operated on this bases.

Figure 23:
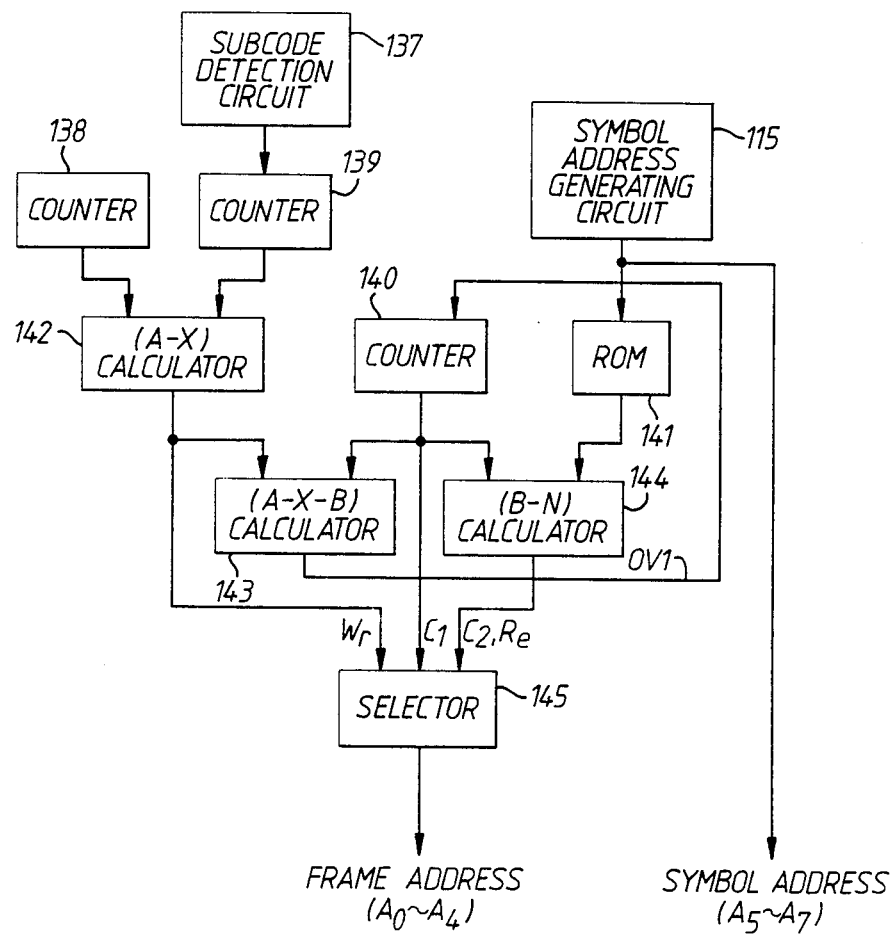
FIG. 23 is a block diagram showing a second embodiment of an erroneous track jump restoration apparatus for an optical record disc player according to the present invention.

FIG. 23 shows a second embodiment of the present invention, in which the means for generating each address of the Wr, C1, C2, and Re is improved. In this case, it is assumed that each address described above is constituted of frame addresses A0 to A4 of 5 bits and symbol addresses A5 to A7 of 3 bits. The symbol addresses A5 to A7 are generated by the symbol address generating circuit 115.

On the other hand, the frame addresses A0 to A4 are generated from the circuit consisting of a subcode detection circuit 137, counters 138 through 140, a ROM 141, calculation circuits 142 through 144, and a selector 145. In this case, the counter 138 is a counter of 5 bits for generating frame addresses of each symbol U0 to U5 at the generation of the Wr address, and it is reset everytime writing of 6 symbols U0 to U5 per frame is finished.

The counter 139 is a counter of 5 bits for setting if Wr address for writing data in the buffer memory 125 by subcode check signal to be described later, which is output from the subcode detection circuit 137 is returned for how many frames and usually the count value is [0]. Subtraction of the contents A of the counter 138 and the contents X of the counter 139 is performed by the calculation circuit 142 as follows, $$A - X.$$

The counter 140 is a counter of 5 bits for generating the frame address of each symbol U0 to U5 when each address of the C1, C2, and Re is generated, and it is reset when error correction of one frame is finished. Subtraction of the output $A-X$ of the calculation circuit 142 and the contents B of the counter 140 is performed by a calculation circuit 143 as follows, $$A - X - B.$$

The ROM 141 is a memory for inputting the symbol addresses A5 to A7 and outputting the fixed value N to be described later. Subtraction of the contents B of the counter 140 and the fixed value N of the ROM is performed as follows, $$B - N.$$

The subtraction by the calculation circuits 142 through 144 is performed modulo 32.

The subtraction result $A-X$ of the calculation circuit 142 becomes the frame address of the Wr, the contents B of the counter 140 becomes the frame address of the C1, the subtraction result $B-N$ of the calculation circuit 144 becomes of each frame address of the C2 and Re. These addresses are selected by the selector 145 and output corresponding to the timing of each data processing. In this case, each frame address of the Wr, C1, C2, and Re is controlled so that it is generated in such a relation as shown in FIG. 24 for each symbol U0 to U5.

FIG. 25 shows the memory map of the data in the buffer memory 125. In this case, the positions of the data specified by each address of Wr, C1, C2, and Re are shown as Wr, C1, C2, and Re respectively. In this case, the buffer memory 125 has a buffer capacity for +4 frames and −19 frames on the basis of the frame address [27] of Wr.

That is, FIG. 25 shows the state of each processing when the subtraction result $A-X$ of the calculation circuit 142 is [27] and the contents B of the counter 140 is [7]. For this purpose, EFM demodulation data is written at the position shown with the frame address [27] (indicated as Wr in the drawing). Also, writing and reading of C1 system for error correction processing are performed at the position shown with the frame address [7] (indicated as C1 in the drawing).

Further, writing and reading of C2 system for error correction processing are performed at the positions shown with the frame addresses [B−6], [B−5], [B−4], [B−3], [B−2], and [B−1], that is, [1], [2], [3], [4], [5], and [6] (indicated as C2 in the drawing) for the symbols U0 to U5. Also, reading of the data where error correction processing is finished is performed at the positions with the frame addresses [B−7], [B−6], [B−5], [B−4], [B−3], and [B−2], that is, [0], [1], [2], [3], [4], and [5] (indicated as Re in the drawing) for the symbol U0 to U5.

Thus, the calculation circuit 143 judges that the buffer is full when the subtraction result $A-X-B$ becomes less than 0 or more than 25, generates buffer over signal OV1 in the counter 140, and presets the counter 140 in the initial state, namely, to $A-20$. Also, at this time, the counter 139 is reset to [0].

For the construction as shown in FIG. 23, the operation is described below. As shown in FIG. 26(a), it is assumed that when the objective lens traces the track N and the output A of the counter 138 is [0], the data of the frame 0 of the track N is written in the buffer memory 125. At this time, the contents X of the counter 139 is [0]. Then, the output A of the counter 138 becomes the Wr address of the buffer memory 125 as it is, and as shown in FIG. 27, the data of the frames 0, 1, 2, 3, . . . of the track N are respectively written in the frame addresses 0, 1, 2, 3, . . . of the buffer memory 125.

In this case, it is assumed that the objective lens causes the track jump in the frame F of the track M when the data of the frame 12 of the track N has been written in the buffer memory 125. Then, the data after the data of the frame F is from the track M. As a result, the data of the frame N of the track M is written in the frame address 21 of the buffer memory 125.

Figure 26:
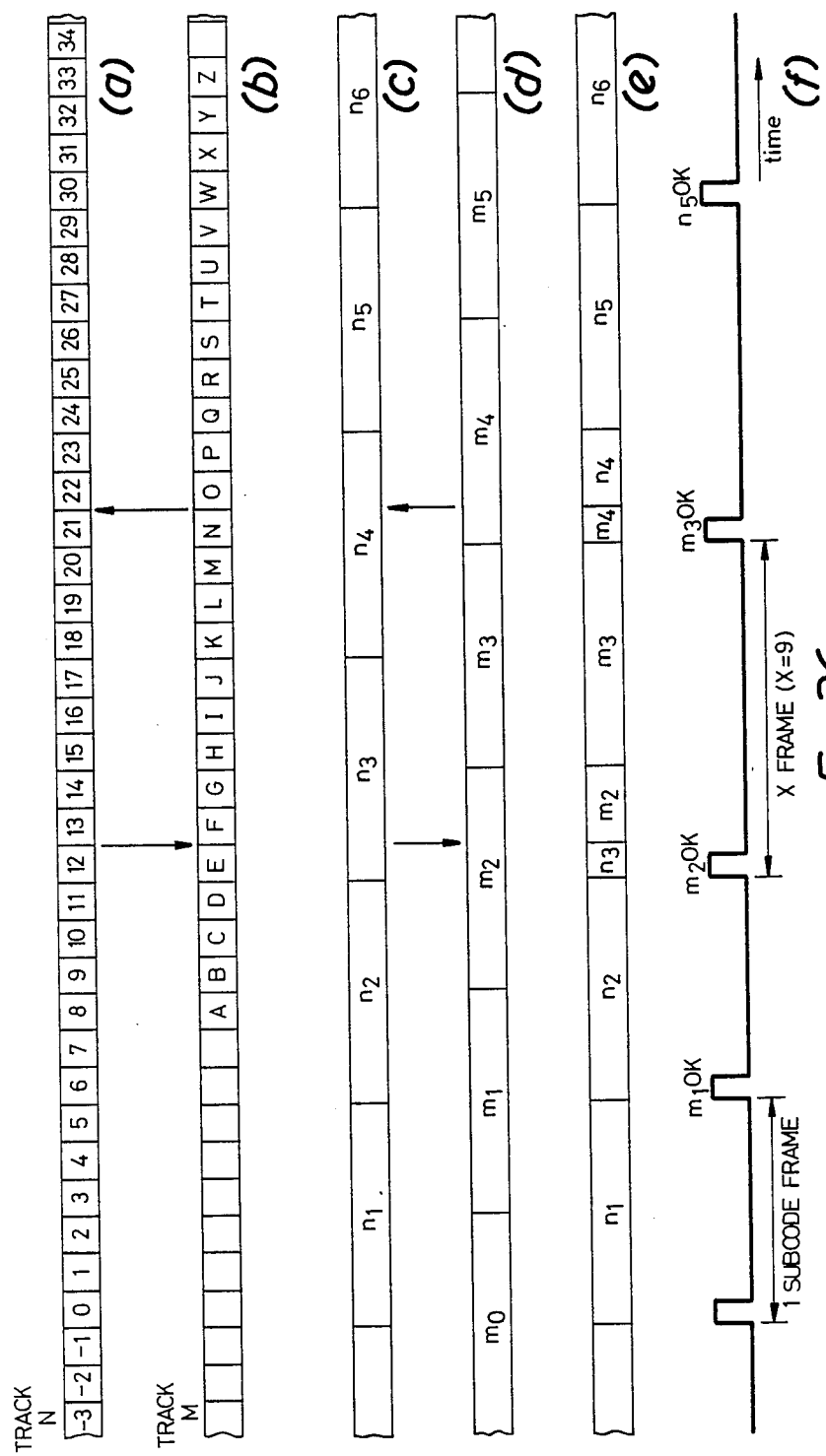
FIG. 26 is a timing chart for describing the operation of the second embodiment shown in FIG. 23.

Now, assuming that one subcode frame is constituted of 6 frames, each subcode data of the tracks N and M can be obtained on a frame basis at the timing shown in FIG. 26(b). When an objective lens jumps from the track N to the track M, the subcode data are changed as shown in FIG. 26(e). FIG. 26(f) shows a subcode check signal output from the subcode detection circuit 137 and a pulse of H level is generated based on the subcode frame. The example shown in FIG. 26 shows that each data of the subcode frames n1, n2, and n5 of the track N and the subcode frame m3 of the track M is correctly detected.

For this reason, the data of the subcode frame m3 can correctly be read when the objective lens first jumps to the track M, and the objective lens returns to the original track N on the basis of the data of the subcode frame m3.

The counter 139 counts the number of the frames between the subcode check signal output from the subcode detection circuit 137 just before the track jump occurs, and the subcode check signal output from the subcode detection circuit 137 just after the track jump occurs. In this case, the number of the frame is [9] and the output X also of the counter 139 is [9].

Accordingly, in this example, when the frame address is 21, that is, when the output A of the counter 138 is 21, the output X of the counter 139 becomes 9, and the Wr address output from the calculation circuit 142 becomes [11]. As a result, the objective lens returns to the original track N and the data obtained by reproducing the first frame 22 is written in the frame address 51 of the buffer memory 125. In like manner, each data obtained by reproducing the frames 23, 24 . . . of the track N is successively written in the frame address 12, 13 . . . of the buffer memory 125, and the data of the track M, which was written previously in the buffer memory 125, is rewritten.

For this reason, when reading the data from the buffer memory 125, the recording data only of the track N is read and the data before and after the track jump can be output continuously.

Figure 28:
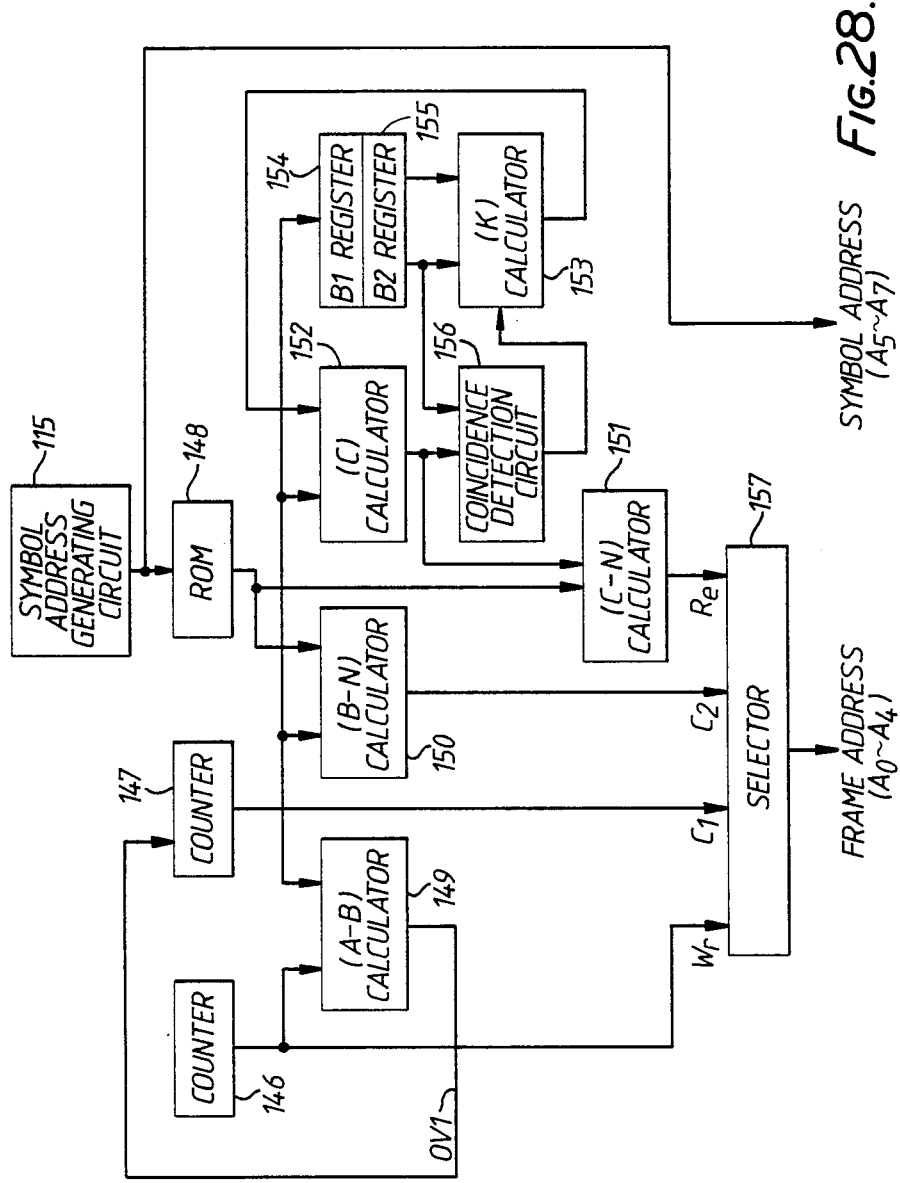
FIG. 28 is a block diagram showing the third embodiment of an erroneous track jump restoration apparatus for an optical record disc player according to the present invention.

FIG. 28 shows a third embodiment of the present invention, in which a means for generating each address of Wr, C1, C2, and Re described above is improved. In this case, it is assumed that each address described above is constituted of frame addresses A0 to A4 of 5 bits and symbol addresses A5 to A7 of 3 bits. The symbol addresses A5 to A7 are generated by the symbol address generating circuit 115.

On the other hand, the frame addresses A0 to A4 are generated from a circuit consisting of counters 146 and 147, a ROM 148, calculation circuits 149 through 153, a B1 registor 154, a B2 registor 155, a coincidence detection circuit 156, and a selector 157. In this case, the counter 146 is a counter of 5 bits for generating the frame address of each symbol U0 to U5 at generation of the Wr address, and it is reset everytime writing of 6 symbols U0 to U5 per frame is finished.

The counter 147 is a counter of 5 bits for generating the frame address of each symbol U0 to U5 at generation of each address of C1, C2, and Re, and it is reset when error correction per frame is finished. Subtraction of the contents A of the counter 146 and the contents B of the counter 147 is performed by the calculation circuit 149 as follows, $$A-B.$$

The ROM 148 is a memory for inputting the symbol addresses A5 to A7 and outputting the fixed value N to be described later. Subtraction of the contents B of the counter 147 and the fixed value N of the ROM 148 is performed by the calculation circuit 150 as follows, $$B-N.$$

The B1 registor 154 latches the contents B contained in the counter 147 before the track jump occurs when a track jump occurs. In this case, the judgement that the track jump occurs is performed by detecting that uncorrectable error is continuously generated in error correction processing of the C2 system. Further, the B2 registor 155 latches the contents B of the counter 147 at the time when the optical lens returns to the original track and normal data can be obtained.

Assuming the contents of the B1 registor 154 as B1 and the contents of the B2 registor 155 as B2, the calculation circuit 153 performs the following calculation, $$k=B2-B1+1.$$

The initial value of the output k of the calculation circuit 153 is [0] and and when the value of k is increased above [22], it is reset to [0].

The calculation circuit 152 performs the following calculation on the basis of the output B of the counter 147 and the calculation result k of the calculation circuit 153

$$C=B-22+k$$

and outputs the calculation result C to the calculation circuit 151 and the coincidence detection circuit 156.

The coincidence detection circuit 156 is a circuit for making the calculation circuit 153 perform the calculation described above when the calculation result C of the calculation circuit 152 and the contents B1 of the B1 registor 154 coincide. Also, the calculation circuit 151 performs the following calculation on the basis of the calculation result C of the calculation circuit 152 and the fixed value N of the ROM 148, $$C-N.$$

In this case, subtraction processing by the calculation circuits 149 through 153 is performed according to the algorithm of [32].

Thus, the contents A of the counter 146 becomes the frame address of Wr, the contents B of the counter 147 becomes the frame address of C1, the subtraction result B−N of the calculation circuit 150 becomes the frame address of C2, and the calculation result C−N of the calculation circuit 151 becomes the frame address of Re. These addresses are selected by the selector 157 and output corresponding to the timing of each data processing. In this case, each frame address of Wr, C1, C2, and Re is controlled so that these addresses are generated with the relation as shown in FIG. 29 for each symbol U0 to U5, respectively.

FIG. 30 shows the memory map of the data in the buffer memory 125. In this case, the positions of the data, which are specified by each address of Wr, C1, C2, and Re are shown as Wr, C1, C2, and Re, respectively. In this case, the buffer memory 125 has a buffer capacity for +1 frame and −1 frame on the basis of the frame address [30] of Wr.

FIG. 30 shows each processing state when the contents A of the counter 146 is [30] and the contents B of the counter 147 is [28]. As the result, the EFM modulation data is written at the position shown with the frame address [30] (indicted as Wr in the drawing). Writing and reading for error correction processing of the C1 system are performed at the position with the frame address [28] (indicated as C1 in the drawing).

Further, writing and reading for error correction processing of the C2 system are performed at the positions with the frame addresses [B−6], [B−5], [B−4], [B−3], [B−2], and [B−1], that is [22], [23], [24], [25], [26], and 8 27] (indicated as C2 in the drawing) for the symbols U0 to U5. Also, reading of the data whose error correction is finished is performed at the positions shown with the frame addresses [C−7], [C−6], [C−5], [C−4], [C−3], and [C−2], that is, [0], [1], [2], [3], [4], and [5] (indicated as Re in the drawing) for the symbols U0 to U5.

Then, the calculation circuit 149 judges that the buffer is full when the subtraction result A−B becomes less than 0 or more than 4, generates buffer over signal OV1 to the counter 147, and presets the counter 147 to the initial state, that is, $$A-2.$$

For the construction as shown in FIG. 28, the operation is described below. As shown in FIG. 31, it is assumed that the objective lens jumps to the frame A of the track M when it traces until the frame 8 of the track N, reads the subcode data of the track M, returns to the frame 15 of the original track N at the frame F, and writes the data of up to the frame 31 as it is in the buffer memory 125, and that the data of the frame 0 of the track N is written in the buffer memory 125 when the output A of the counter 146 is [0].

Then, the memory map of the buffer memory 125 becomes as shown in FIG. 32. The data of C2, which is obtained when the output B of the counter 147 is [11], becomes (5, 6, 7, 8, A, B) and is not connected. It is judged that the track jump occurs at this time and the output B of the counter 147 (that is, 11−2=9) is latched by the B1 registor 154.

When the output B of the counter 147 is successively increased and becomes (21), the C2 system data becomes [15, 16, 17, 18, 19, and 20] and it is judged as a normal data returned to the original track N and the output B (that is, 21) of the counter 147 is latched by the B2 registor 155. When the output B of the counter 147 reaches [31], the output C of the calculation circuit 152 becomes as follows, $$C = B - 22 + k$$
$$= 31 - 22 + 0 = 9$$

since the output B of the counter 57 is 31 and k is 0. The frame address of Re for reading each symbol U0 to U5 becomes [3, 4, 5, 6, 7, and 8] from the relation in FIG. 29 and becomes the normal data of the track N.

At this time, the output C (that is, 9) of the calculation circuit 152 and the value [9] latched by the B1 registor 154 coincide, and the calculation circuit 153 is driven by operation of the coincidence detection circuit 156. For this reason, the output k of the calculation circuit 153 becomes as follows, $$k = B1 - B2 - 1$$
$$= 21 - 9 - 1 = 11$$

since the output B1 of the B1 registor 154 is 21 and the output of the B2 registor 155 is 9.

Accordingly, the output C of the calculation circuit 152 at the time when the output B of the counter 147 becomes the next value, that is, [0] from [31] (this can be considered as modulo 32, is as follows, $$C = B - 22 + k$$
$$= 32 - 22 + 11 = 21$$

The output B of the counter 147 is 32 and k is 11 and the frame address of R for reading each symbol U0 to U5 becomes [15, 16, 17, 18, 19, and 20] from the relation in FIG. 29. Thus, the data before the track jump and the data obtained after return to the original track N can be read continuously.

Figure 33:
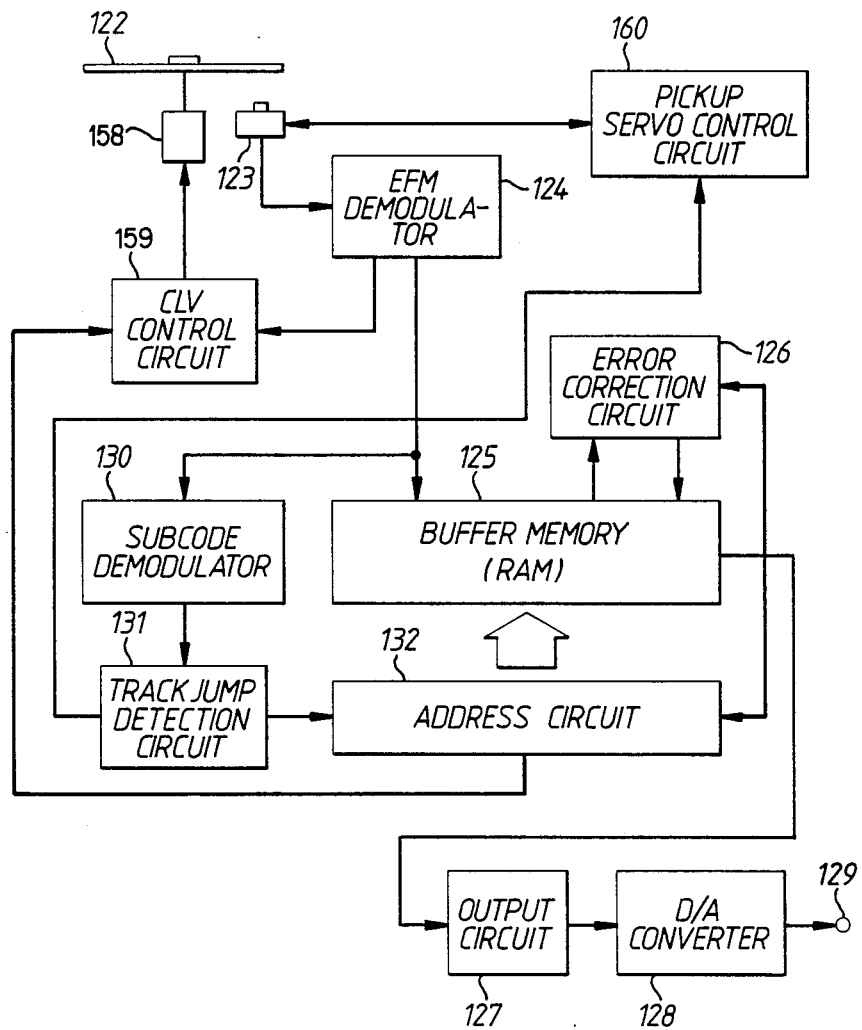
FIG. 33 is a block diagram showing the fourth embodiment of an erroneous track jump restoration apparatus for an optical record disc player according to the present invention.

FIG. 33 shows a fourth embodiment of the present invention, wherein like reference characters as in FIG. 10 designate like or corresponding parts and different parts only are described in this embodiment. The disc 122 is rotated so that a disc motor 158 is rotated and controlled and the line speed becomes constant. The servo data components output from the EFM demodulation circuit 124 are supplied to a CLV control circuit 159.

When the track jump is detected by the track jump detection circuit 131, the track jump detection circuit 131 generates a signal for instructing the pickup servo circuit 160 to return the objective lens of the optical pickup 123 to the original track. In such a manner as described above, when the objective lens returns to the original track, the CLV control circuit 159 is controlled by the output of the address circuit 132, the disc 122 is rotated at a higher speed than the usual speed and the recorded data of the disc 122 can be read at a high speed. At this time, the error correction processing speed is accelerated by the correction circuit 126 to correspond to the reading speed of the recorded data of the disc 122.

For the construction as shown in FIG. 33, the operation is described below. In this case, as shown in FIG. 34(a), it is assumed that the objective lens experiences a track jump to the track M in a state that the objective lens traces the track N and returns to the track N again. Normally, as shown in FIG. 34(b), the data A before the track jump of the track N, the data B of the track M, and the data A' of the track N after return are recorded in the buffer memory 125.

In FIG. 34(b), Wr, C1, C2, and Re show the Wr address, C1 address, C2 address, and Re address described above.

In this embodiment, when the C2 address exceeds x1 in FIG. 34(b), the error of the C2 system is generated as described in the third embodiment, and when the track jump is detected by using detection of the track jump, writing of the data B of the track M is stopped. Thus, writing of the data A' is started again when the lens has returned to the original track N.

However, in this case, as shown in FIG. 34(c), data is recorded in the buffer memory 125 and the memory area (x1 to x2) of the data shown in FIG. 34(b) is deleted and reduced. For this reason, usually, as shown in FIG. 34(d), the normally large buffer capacity S is reduced to S' and reduction of the buffer capacity is generated everytime a track jump occurs until the buffer capacity becomes zero.

Therefore, in this embodiment, the buffer capacity is returned to the original quantity by accelerating the rotation speed of the disc motor 158 and the error correction processing speed from the time when the pickup returns to the original track N, and by accelerating the advancing speed of the Wr address and the C1 and C2 addresses, thereby to take a countermeasure against the next track jump.

Figure 34:
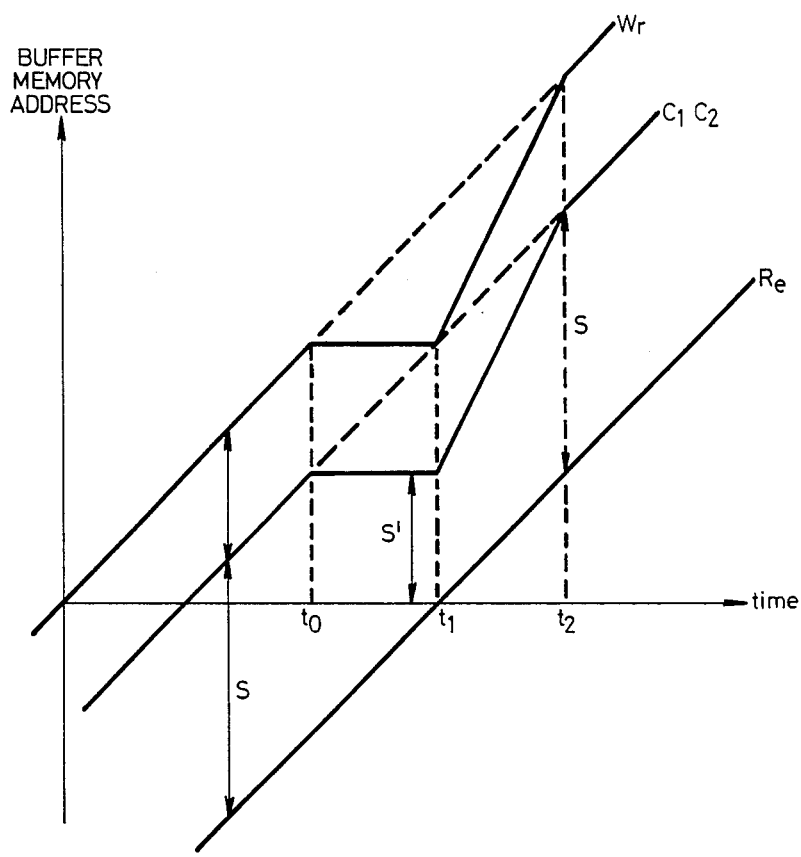
FIG. 34 is a timing chart for describing the operation of the fourth embodiment shown in FIG. 33.
Figure 34:
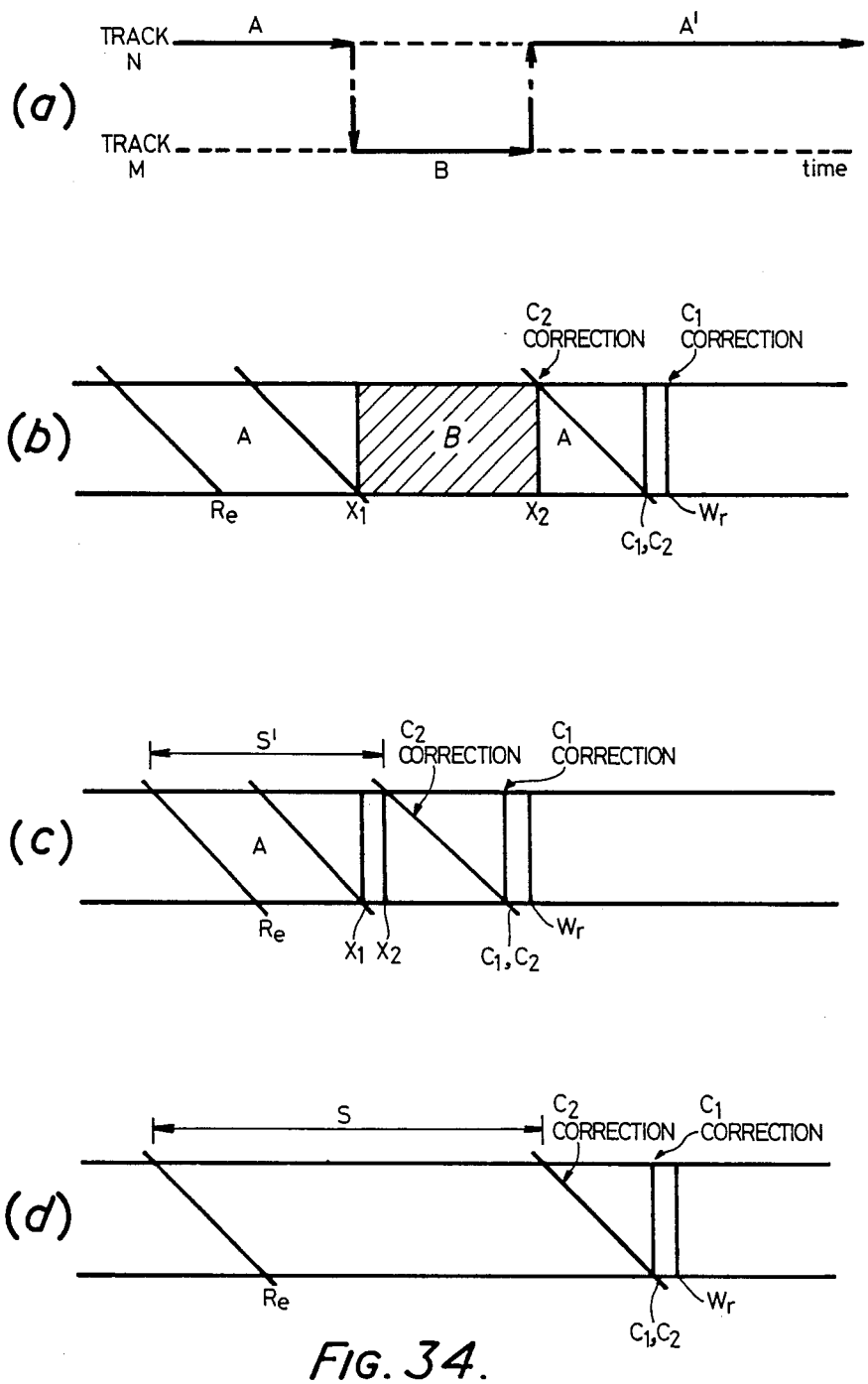

FIG. 34 shows the relation of each address of Wr, C1, C2, and Re and the buffer quantity in the state where a track jump occurs. At the time before the time t0, addresses Wr, C1, C2 and Re are increased in a fixed inclination parallel to each other, and the buffer quantity S also is a fixed quantity. When the track jump is detected at the time to, increase of each address of Wr, C1, and C2 is stopped, but the Re address continues to increase.

For this reason, when the pickup returns to the original track N, the buffer quantity S becomes S'. In the embodiment, the increasing speed of each address of Wr, C1, and C2 is accelerated by accelerating the rotation speed of the disc 122 and the error correction processing speed after the time t1, and the rotation speed of the disc 122 and the error correction processing speed are returned to the original speed at the time t2, when the buffer quantity becomes the original S.

Figure 35:
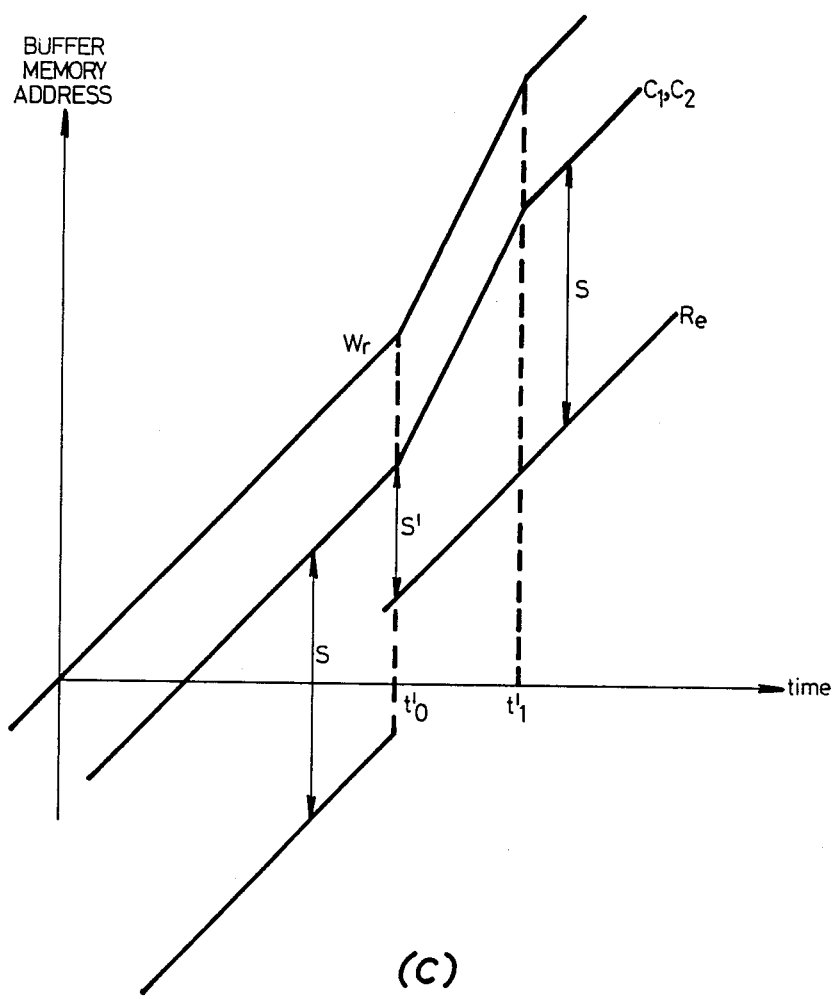
FIG. 35 is a timing chart showing a modification of the operation of the fourth embodiment shown in FIG. 33.

FIG. 35 shows a modification of the fourth embodiment. In this modification, description is given assuming that the track jump, as shown in FIG. 34(a), occurs. As shown in FIG. 35(a), the data B of the track M are written in the buffer memory 125 when the Re address reaches the address x, where the data B is memorized.

In this case also, the buffer quantity is reduced to S', and returns to the original quantity by accelerating the advancing speed of Wr address and C1 and C2 addresses for the buffer memory 125, thereby compensating for the next track jump.

FIG. 35(c) shows the relation of each address of Wr, C1, C2, and Re and the buffer quantity in the state when a track jump occurs. That is, at the time before the time to′, addresses Wr, C1, C2, and Re are increased in a fixed inclination parallel each other, and the buffer quantity S also is a fixed quantity. When the track jump is detected at the time tO′, the Re address jumps, and the buffer quantity becomes S′.

At this time, the increasing speed of each address of Wr, C1, and C2 is accelerated (making the inclination in the drawing larger) by accelerating the rotation speed of the disc 122 and error correction processing speed, and the rotation speed of the disc 122 and the error correction processing speed are returned to the original speed at the time t1 when the buffer quantity becomes S.

Figure 36:
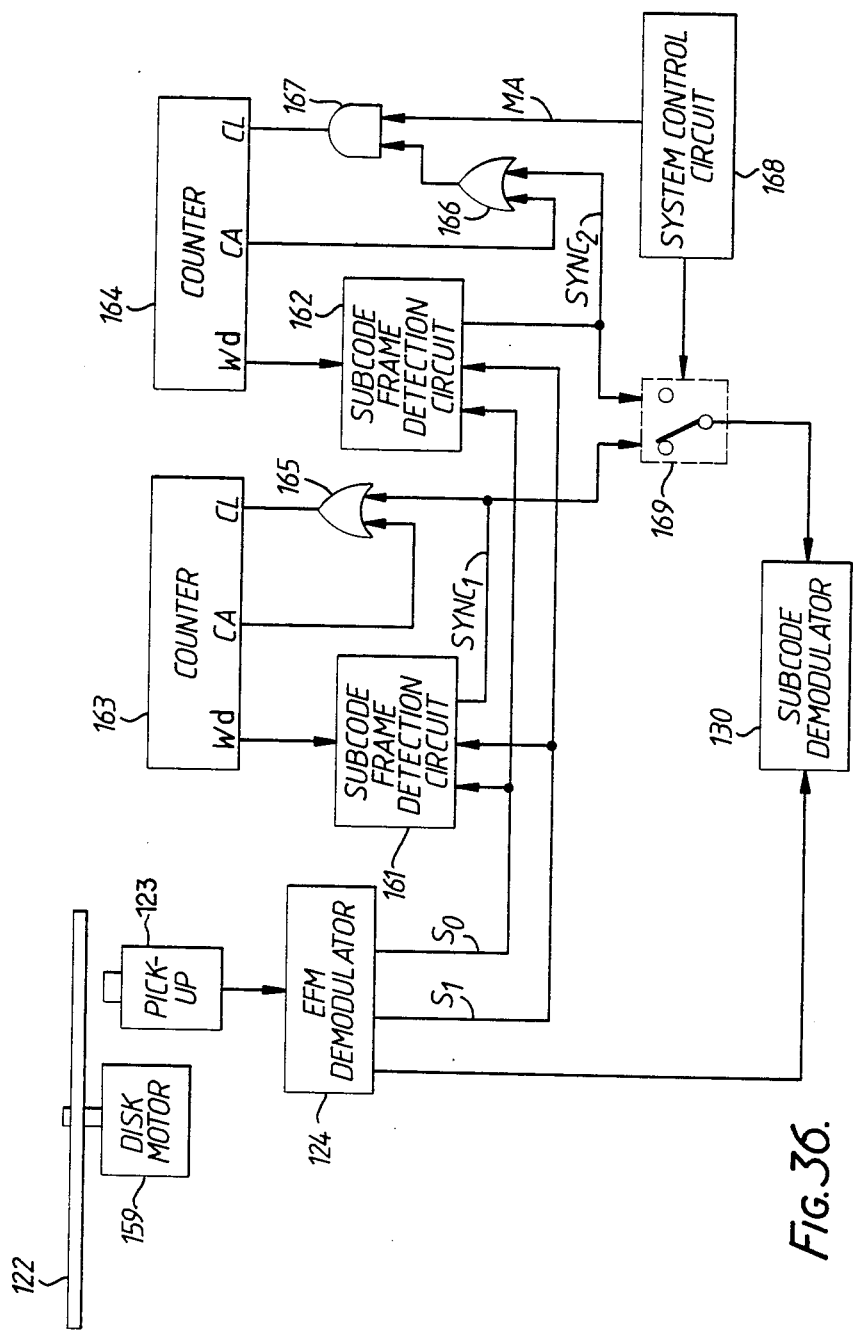
FIG. 36 is a block diagram showing the fifth embodiment of an erroneous track jump restoration apparatus for an optical record disc player according to the present invention.

Referring now to FIG. 36, a fifth embodiment of the erroneous track jump restoration apparatus for an optical record disc player according to the present invention will be described in detail. In FIG. 36, data recorded on a disc 122 is read by an optical pickup 123. The data read by the optical pickup 123 is applied to an EFM demodulation circuit 124. The EFM demodulation circuit 124 carries out an EFM demodulation for the data. The EFM demodulation circuit 124 also discriminates subcode frame synchronous patterns S0 and S1. These subcode frame synchronous patterns S0 and S1 are applied to subcode frame detection circuits 161 and 162, respectively. Each of the subcode frame detection circuits 161 and 162 generates a subcode frame synchronous signal SYNC1 and SYNC2, respectively, by detecting at least one of the subcode frame synchronous patterns S0 and S1 as data. The subcode frame synchronous signals SYNC1 and SYNC2 are produced from the subcode frame detection circuits 161 and 162, respectively, when the signals SNYC1 and SYNC2 synchronize with window signals Wd1 and Wd2 outputted from counters 163 and 164, which will be described later.

The counters 163 and 164 are constituted by [98] counters. The counters 163 and 164 output carry signals CA in every count of [98], respectively. The carry signals CA are applied to their own reset terminals CL through OR gates 165 and 166 so that the counters 163 and 164 are reset, respectively. The subcode frame synchronous signals SYNC1 and SYNC2 are also applied to their own reset terminals CL of the counters 163 and 164 through the OR gates 165 and 166 so that the counters 163 and 164 are reset.

However, an output of the OR gate 166 is applied to the reset terminal CL of the counter 164 through an AND gate 167. The AND gate 167 has an input connected to a system control circuit 168. The system control circuit 168 is constituted by, e.g., a microcomputer and outputs a mask signal MA of an L level, when the circuit 167 detects a track jump. So that, the outputs of the OR gate 166, i.e., the carry signal CA and the subcode frame synchronous signal SYNC2 are gated OFF at the AND gate 167 by the mask signal MA of the L level during the track jump.

The subcode frame synchronous signals SYNC1 and SYNC2 are selectively output to a subcode demodulation circuit 130 through a selector 169. The selector 169 is controlled by the system control circuit 168 so that the subcode frame synchronous signal SYNC1 is connected to the outout terminal 169 in a reproduction of the disc 122. On the other hand, the subcode frame synchronous signal SYNC2 is connected to the subcode demodulation circuit 130 during the track jump. The subcode demodulation circuit 130 discriminates an addresses from subcode frames detected by the EFM demodulation circuit 124 in synchronism with the subcode frame synchronous signal SYNC1 or SYNC2 applied through the selector 169.

Figure 37:
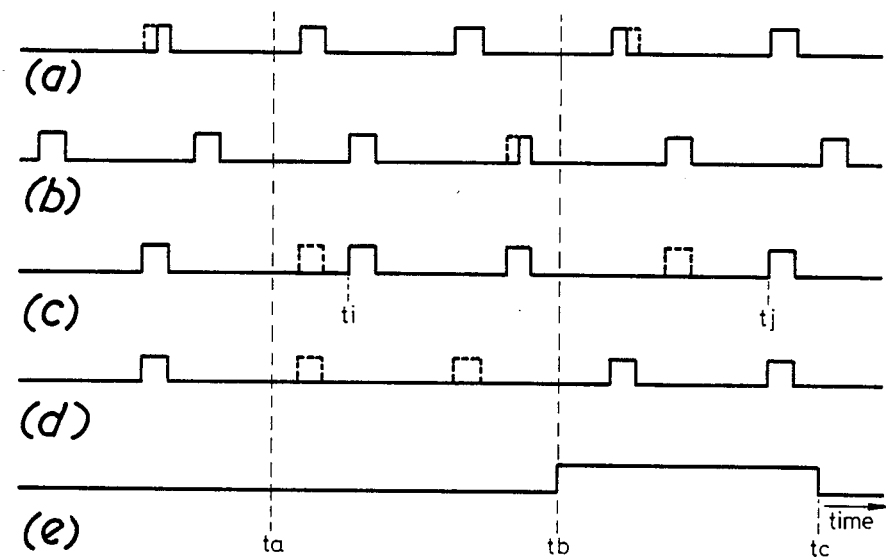
FIG. 37 is a timing chart for describing the operation of the fifth embodiment shown in FIG. 36.

Referring now to FIG. 37, the operation of the fifth embodiment of the erroneous track jump restoration apparatus will be described. FIG. 37 shows timing charts of signals in the fifth embodiment, as shown in FIG. 36. The EFM demodulation circuit 124 produces the subcode frame synchronous patterns S0 and S1, as shown in FIG. 37(a) or 37(b), when tracing a predetermined track N or another track M, respectively. In FIGS. 37(a) and 37(b), each dotted area indicates missing of the subcode frame synchronous pattern S0 or S1. As shown in FIGS. 37(a) and 37(b), the subcode frame synchronous patterns S0 and S1 obtained from the track N and M generally arise asynchronously with each other.

The subcode frame detection circuits 161 and 162 generate the subcode frame synchronous signals SYNC1 and SYNC2, as shown in FIGS. 37(c) and 37(d), respectively. The subcode frame detection circuits 161 and 162 may generates the subcode frame synchronous signals SYNC1 and SYNC2 in response to at least one of the subcode frame synchronous pattens S0 and S1. In FIGS. 37(c) and 37(d), each dotted area indicates the window signal Wd output from the counters 163 and 164.

In the normal reproducing state before a track jump occurs at a time ta, the subcode frame synchronous signals SYNC1 and SYNC2 output from the subcode frame detection circuits 161 and 162 are synchronous with each other, as shown in FIGS. 37(c) and 37(d), respectively. The system control circuit 168 sontrols the selector 169 so that only the subcode frame synchronous signal SYNC1 is applied to the subcode demodulation circuit 130. On the other hand, the system control circuit 168 applies the AND gate 167 with the mask signal MA of an H level so that the AND gate 167 gates ON and applies the carry signal CA and the subcode frame synchronous signal SYNC1 to the counter 164. As a result, the counters 163 and 164 output the window signals Wd synchronized with the subcode frame synchronous signals SYNC1 and SYNC2, respectively.

When the track jump from the track N to track M has occured at the time ta, the subcode frame synchronous signal SYNC1 has failed to be outputted. Itis because the subcode frame synchronous patterns SO and S1 obtained from the track M, as shown in FIG. 37(b), are not synchronous with the window signal Wd after the time ta. After that, the counter 163 is controlled by itself so that the window signals Wd becomes synchronous with the subcode frame synchronous patterns S0 and S1 at the time ti, as shown in FIG. 37(c). Then, the counter 163 produces the subcode frame synchronism signal SYNC1 in synchronism with the subcode frame synchronous patterns S0 and S1 obtained from the track M. The subcode frame synchronous signal SYNC1 is applied to the subcode demodulation circuit 130 through the selector 169 so that address data are obtained in response to the subcode data reproduced from the track M.

On the other hand, the system control circuit 168 applies the AND gate 167 with the mask signal MA of the L level after the time ta so that the carry signal CA and the subcode frame synchronous signal SYNC2 fail to be applied to the reset terminal CL of the counter 164. Therefore, the counter 164 continues the count operation the same as that of before the time ta, as shown in FIG. 37(d). Then, the counter 164 sucessively outputs the subcode frame synchronous signal SYNC2, as shown in FIG. 37(d). The subcode frame synchronous signal SYNC2 arises at timings near to the timings of the subcode frame synchronous patterns S0 and S1 obtained from the track N during the track jump after the time ta.

When the track jump is corrected at a time tb, in accordance with the subcode frame synchronous signal SYNC1, the system control circuit 168 applies the selector 169 with a switch control signal SC of an H level, as shown in FIG. 37(e). The signal SC of the H level controls the selector 169 so that the subcode frame synchronous signal SYNC2, as shown in FIG. 37(d), synchronized with the subcode frame synchronous patterns S0 and S1 obtained from the track N is applied to the subcode demodulation circuit 130, instead of the subcode frame synchronous signal SYNC1. As a result, the subcode frame synchronous signal SYNC2 is used for a discrimination of the address data just after the correction of the track jump to the original track N. It is because the subcode frame synchronous signal SYNC2 is substantially synchronized with the subcode frame synchronous patterns S0 and S1 obtained from the track N, as described before.

The subcode frame synchronous signal SYNC1 has again failed to be outputted, just after the time tb when the track jump is corrected. It is because the subcode frame synchronous patterns S0 and S1 obtained from the track N, as shown in FIG. 37(b), are not synchronous with the window signal Wd after the time tb. After that, the counter 163 is controlled by itself so that the window signals Wd becomes synchronous with the subcode frame synchronous patterns S0 and S1 at the time tj, as shown in FIG. 37(c). On the other hand, the system control circuit 168 changes the switch control signal SC to an L level, as shown in FIG. 37(e) at a prescribed time tk after the time tj. Then, the subcode frame synchronous signal SYNC1 in synchronous with the subcode frame synchronous patterns S0 and S1 obtained from the track N is applied to the subcode demodulation circuit 130.

According to the fifth embodiment, the counter 163 operates to make the window signal Wd synchronous with the subcode frame synchronous patterns S0 and S1 obtained from the data of the track M when the track jump has occured. Meanwhile, the counter 164 continuously outputs the window signal Wd, which is in substantially synchronous with the subcode frame synchronous patterns S0 and S1 obtained from the data of the track N. As a result, the erroneous track jump restoration apparatus can obtain the subcode frame synchronous signal immediately after the correction of the track jump to the original track.

Figure 38:
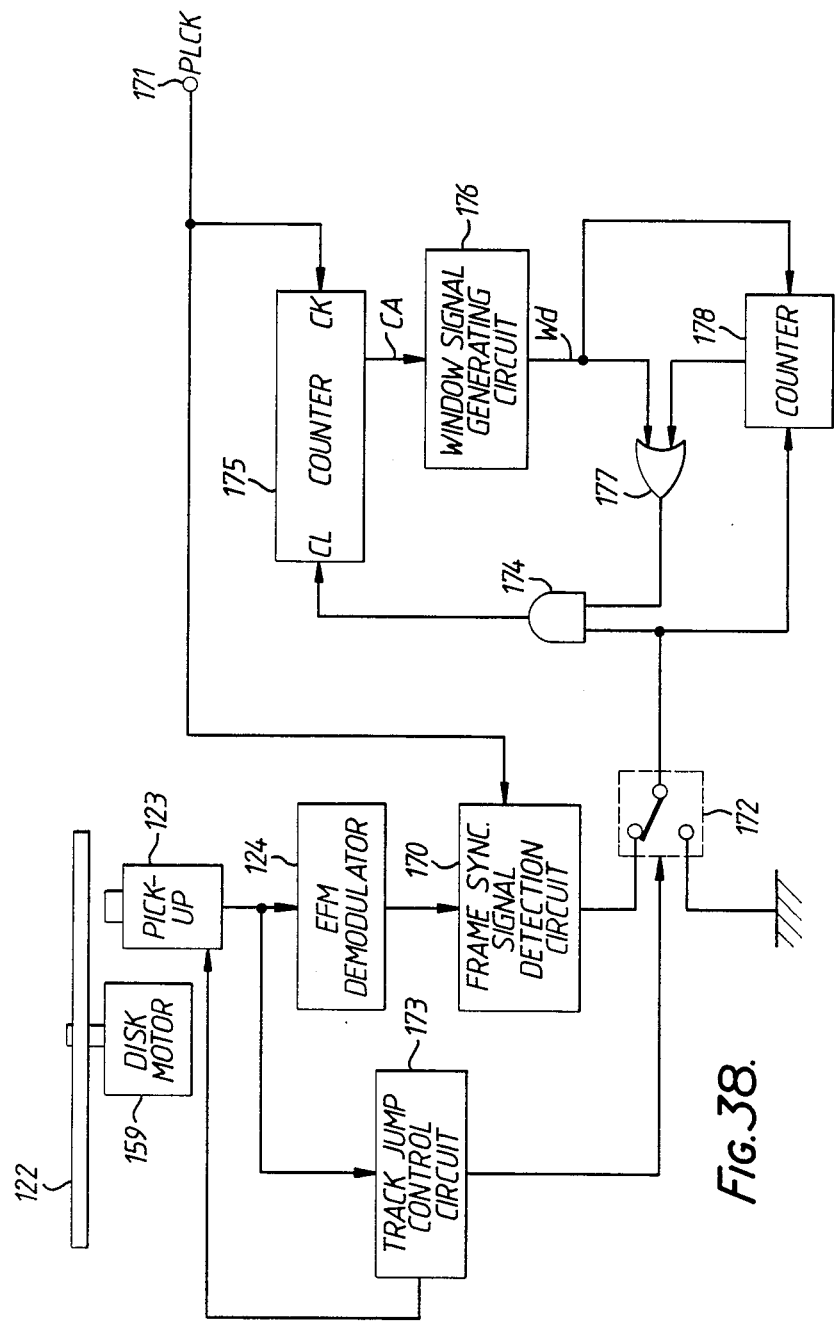
FIG. 38 is a block diagram showing the sixth embodiment of an erroneous track jump restoration apparatus for an optical record disc player according to the present invention.

Referring now to FIG. 38, a sixth embodiment of the erroneous track jump restoration apparatus for an optical record disc player according to the present invention will be described in detail. In FIG. 38, data recorded on a disc 122 is read by an optical pickup 123. The data read by the optical pickup 123 is applied to an EFM demodulation circuit 124. The EFM demodulation circuit 124 carries out an EFM demodulation. The EFM demodulation signal EFM is applied to a frame synchronous signal detection circuit 170. The frame synchronous signal detection circuit 170 operates on the EFM demodulation signal EFM in synchronism with a bit clock signal PLCK applied to a clock input terminal 171 so that a frame synchronous signal FSYNC is discriminated. The frame synchronous signal FSYNC is applied to one input of the selector 172. The selector 172 is controlled by a track jump control circuit 173, which will be described later, so that the frame synchronous signal FSYNC is applied to one input of an AND gate 174.

The bit clock signal PLCK is further applied to a clock terminal CK of a counter 175. The counter 175 is constituted by [588] cyclic counters which is cleared by itself at every count of [588] and then outputs a carry signal CA. The carry signal CA is applied to a window signal producing circuit 176. The window signal producing circuit 176 outputs a window signal Wd of an H level with a prescribed pulse width in response to the carry signal CA. The window signal Wd is applied to another input of the AND gate 174 through an OR gate 177. The output of the AND gate 174 is coupled to a reset terminal CL of the counter 175.

When the frame synchronous signal FSYNC obtained by reproducing the disc 122 is synchronous with the window signal Wd, the window signal Wd gates ON the AND gate 174 at the timing of the frame synchronous signal FSYNC so that the counter 175 is reset by the frame synchronous signal FSYNC. As a result, the counter 175 operates in synchronism with the frame synchronous signal FSYNC.

The frame synchronous signal FSYNC and the window signal Wd are applied to a counter 178 so that the counter 178 counts inconsistencies between the frame synchronous signal FSYNC and the window signal Wd. When the count of the counter 178 reaches a prescribed value, the counter 178 outputs a signal of an H level and applies it to the OR gate 177. The inconsistencies between the frame synchronous signal FSYNC and the window signal Wd occur in response to, e.g., a dropout of data from the reproduced signal of the optical pickup 123. As a result, the counter 175 is reset when a prescribed number of the frame synchronous signal FSYNC are missed in accordance with the dropout of the data. Then, the counter 175 is controlled by itself so that the window signal Wd becomes in synchronism with the frame synchronous signal FYSNC obtained after the dropout of the data.

The reproduced signal of the disc 122 by the optical pickup 123 is applied to the track jump control circuit 173. The track jump control circuit 173 detects a track jump by a conventional manner such as a detection of tracking error signals. The tracking error signal is generated when a light beam of the pickup 123 crosses a track of the disc 122. A track jump detection signal TJ output from the track jump control circuit 173 is applied to the selector 172 so that the selector 172 is controlled to apply the AND gate 174 with a ground potential with an L level.

The track jump control circuit 173 further counts a number of tracks when a track jump has occured and controls to make the pickup 123 return the original track before the track jump in response to a count of the tracks.

Figure 39:
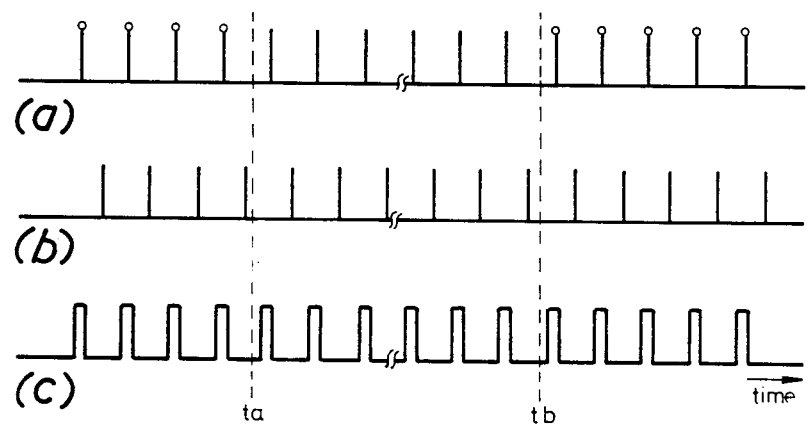
FIG. 39 is a timing chart for describing the operation of the sixth embodiment shown in FIG. 38.

Referring now to FIG. 39, the operation of the sixth embodiment of the erroneous track jump restoration apparatus will be described. FIG. 39 shows timing charts of signals in the fifth embodiment, as shown in FIG. 38. The frame synchronous signal detection circuit 170 produces a frame synchronous signal FSYNC1 or FSYNC2, as shown in FIGS. 39(a) and 39(b), when tracing a predetermined track N or another track M, respectively. The frame synchronous signals FSYNC1 and FSYNC2 are provided for discriminating the main data or the address data recorded in the tracks N and M. FIG. 39(c) shows a window signal Wd which is formed in response to the frame synchronous signal FSYNC1 or FSYNC2.

As shown in FIGS. 39(a) and 39(b), the frame synchronous signals FSYNC1 and FSYNC2 obtained from the tracks N and M generally arise asynchronously with each other. The frame synchronous signal FSYNC1 (indicated with marks "o" in the drawing) before the track jump at the time ta is synchronized with the window signal Wd so that the signal FSYNC1 can be provided for a reproduction of the main data or the address data.

When a track jump occurs at the time ta, the track jump control circuit 173 controls the selector 172 so that the ground potential of the L level is applied to the AND gate 174. The AND gate 174 is gated OFF so that the reset terminal CL of the counter 175 is L level. In this state, the counter 175 repeats a cyclic count operation so that the window signal producing circuit 176 outputs the window signal Wd continuously at the timing the same as that before the track jump at the time ta. The window signal Wd during the track jump is substantially synchronous with the window signal Wd (indicated with the marks "o") before the time ta.

When the track jump is corrected at a time tb by the track jump control circuit 170, the window signal Wd immediately becomes synchronous with the frame synchronous signal FSYNC1. It is because that the window signal within the truck jump has been continuously in synchronism with the frame synchronous signal FSYNC1 (indicated with the marks "o") before the time ta, as described before.

According to the sixth embodiment, the window signal producing circuit 176 operates to make the window signal Wd synchronous with the frame synchronous signal FSYNC before a track jump has occured. As a result, the erroneous track jump restoration apparatus can obtain the frame synchronous signal immediately after the correction of the track jump to the original track.

As described above in detail, the present invention can provide an extremely satisfactory disc reproducing device designed so that no gap in the data obtained until a pickup returns to its original track is noticed by listeners when a track jump occurs.

While there has been illustrated and described what are at present considered to be preferred embodiments of the present invention, it will be understood by those skilled in the art that various changes and modifications may be made, and equivalents may be substituted for devices thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A apparatus for reproducing data stored on a disc in a plurality of tracks connected in a continuous spiral or separated in concentric tracks, comprising:
   means for rotating the disc;
   optical pickup means aligned with one of the tracks for reading the data from the track, the pickup means being subject to jump movement of alignment with the track into alignment with another track in response to movement of the apparatus;
   buffer memory means for temporarily storing successive portions of the data read from the track for delaying reproduction of the data for a predetermined time after the reading of the data;
   track jump detection means for detecting movement of the pickup means into alignment with another track and interrupting temporary storage of the data read from the other track by the buffer memory means;
   drive means for moving the pickup means with respect to the disc for reading data, and for changing the alignment of the pickup means from the other track to the one track in response to the track jump detection means; and
   output means for substantially uninterrupted reproduction of the temporarily stored data.

2. The apparatus of claim 1 wherein the buffer memory means has a capacity sufficient to delay reproduction of the data for a time substantially necessary to change the alignment of the pickup means to the one track.

3. The apparatus of claim 2 wherein the buffer memory means includes a random access memory.

4. A apparatus for reproducing data stored on a disc in a plurality of tracks connected in a continuous spiral or separated in concentric tracks, comprising:
   means for rotating the disc;
   optical pickup means aligned with one of the tracks for reading the data from the track, the pickup means being subject to jump movement of alignment with with the one track into alignment with another track in response to movement of the apparatus;
   buffer memory means for temporarily storing portions of the data read from the track for delaying reproduction of the data after the reading of the data;
   track jump detection means for detecting movement of the pickup means into alignment with the other track;
   drive means for moving the pickup means with respect to the disc for reading data, and for changing the alignment of the pickup means from the other track to the one track in response to the track jump detection means; and
   address means for substantially uninterrupted reproduction of only the data read by the pickup means when the pickup means was aligned with the one track.

5. A apparatus for reproducing data stored on a disc in a plurality of tracks connected in a continuous spiral or separated in concentric tracks, comprising:
   means for rotating the disc;
   optical pickup means aligned with one of the tracks for reading the data from the track, the pickup means being subject to jump movement of alignment with with the one track into alignment with another track in response to movement of the apparatus;

buffer memory means for temporarily storing portions of the data read from the track for delaying reproduction of the data after the reading of the data;

track jump detection means for detecting movement of the pickup means into alignment with the other track;

drive means for moving the pickup means with respect to the disc for reading data, and for changing the alignment of the pickup means from the other track to the one track in response to the track jump detection means; and shift register means for substantially uninterrupted reproduction of only the data read by the pickup means when the pickup means was aligned with the one track.

* * * * *